(12) United States Patent
Sellappa et al.

(10) Patent No.: US 11,689,448 B2
(45) Date of Patent: Jun. 27, 2023

(54) OPTIMIZED PROGRAMMING OF FORWARDING DATA IN NETWORK DEVICE HARDWARE

(71) Applicant: Arista Networks, Inc., Santa Clara, CA (US)

(72) Inventors: Sriram Sellappa, Santa Clara, CA (US); Mayukh Saubhasik, Richmond (CA); Imtiyaz Mohammad, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/563,969

(22) Filed: Dec. 28, 2021

(65) Prior Publication Data

US 2022/0124026 A1    Apr. 21, 2022

Related U.S. Application Data

(62) Division of application No. 16/533,558, filed on Aug. 6, 2019, now Pat. No. 11,252,051.

(51) Int. Cl.
*H04L 45/24* (2022.01)
*H04L 45/02* (2022.01)

(52) U.S. Cl.
CPC .............. *H04L 45/24* (2013.01); *H04L 45/02* (2013.01)

(58) Field of Classification Search
CPC ...................................................... H04L 45/24
See application file for complete search history.

(56) References Cited

U.S. PATENT DOCUMENTS

| 2009/0185478 | A1* | 7/2009 | Zhang | H04L 45/02 370/216 |
| 2014/0369356 | A1* | 12/2014 | Bryant | H04L 45/745 370/392 |
| 2015/0078378 | A1* | 3/2015 | Wijnands | H04L 45/74 370/390 |
| 2016/0119229 | A1* | 4/2016 | Zhou | H04L 45/507 370/392 |
| 2016/0337251 | A1* | 11/2016 | Venkataramanan | H04L 47/2441 |
| 2017/0288970 | A1* | 10/2017 | Lin | H04L 45/54 |
| 2018/0337852 | A1* | 11/2018 | Gunalan | H04L 45/54 |

* cited by examiner

*Primary Examiner* — Jason E Mattis
(74) *Attorney, Agent, or Firm* — Fountainhead Law Group P.C.

(57) ABSTRACT

Some embodiments provide techniques for optimized programming of forwarding data in network device hardware. An operating system executing on the network device receives information associated with a network topology of a network(s) to which the network device belongs. Based on this information, the operating system can generate various data structures that facilitate the routing and forwarding of data through the network device. Based on the generated data structures, the operating system may then program hardware resources in the network device in order to implement routing and forwarding operations stored in the data structures. During generation of the data structures, the operating system may perform some operations to optimize the programing of the hardware resources in a manner that reduces the amount of hardware resources that would otherwise be used without such optimizations.

20 Claims, 14 Drawing Sheets

OPTIMIZED PROGRAMMING OF FORWARDING DATA IN NETWORK DEVICE HARDWARE

CROSS REFERENCE TO RELATED APPLICATION

This application is a divisional of U.S. patent application Ser. No. 16/533,558, filed Aug. 6, 2019, the entire contents of which are incorporated herein by reference in its entirety for all purposes. U.S. patent application Ser. No. 16/533,558 is related to U.S. patent application Ser. No. 16/533,332, entitled "System And Method For Processing Information Hierarchy Management," filed on Aug. 6, 2019.

BACKGROUND

Network devices are generally used to facilitate the exchange of data and resources between devices connected to a network. Typically, network devices have hardware resources that are used to process data, forward data, bridge networks together, provide compatibility between networks, etc. Since network devices have a fixed amount of hardware resources, more hardware resources are utilized as the scale of the networks in which the network devices are deployed increases in order to support the larger scale of the networks. Some solutions can address this problem by adding even more hardware resources to the network device. Other solutions may employ technique for optimizing the use of the hardware resources.

SUMMARY

Techniques for optimized programming of forwarding data in network device hardware are provided. In some embodiments, a network device receives information associated with a network topology of a network comprising a plurality of network devices. The network topology includes a first tunnel and a second tunnel. The first tunnel includes a first plurality of multipath routes. The second tunnel includes a second plurality of multipath routes. The network device further determines that the first tunnel is configured to run through the network device and configured to replace a first value of encapsulation data of a first packet received at the network device with a same first value for egress from the network device, the second tunnel is configured to run through the network device and configured to replace a second value of encapsulation data of a second packet received at the network device with a same second value for egress from the network device, and the first plurality of multipath routes and the second plurality of multipath routes share a plurality of possible next hops from the network device. Based on the determination, the network device also programs a set of hardware resources of the network device to store a set of next hop operations for each possible next hop in the plurality of possible next hops, forward a first incoming packet through the first tunnel to a first next hop in the plurality of possible next hops based on the stored sets of next hop operations without replacing the encapsulation data of the first packet, and forward a second incoming packet through the second tunnel to a second next hop in the plurality of possible next hops based on the same stored sets of next hop operations without replacing the encapsulation data of the second packet.

In some embodiments, a network device receives information associated with a network topology of a network that includes a plurality of network devices. The network topology includes a first tunnel and a second tunnel. The first tunnel includes a first plurality of multipath routes. The second tunnel includes a second plurality of multipath routes. The network device further determines that the network device is an egress of the first tunnel that is configured to remove encapsulation data, the network device is an egress of the second tunnel that is configured to remove encapsulation data, and the egress of the first tunnel at the network device and the egress of the second tunnel at the network device share a next hop from the network device. Based on the determination, the network device also programs a set of hardware resources of the network device to store a set of next hop operations for the next hop from the network device, forward a first incoming packet through the egress of the first tunnel to the next hop based on the stored set of next hop operations, and forward a second incoming packet through the egress of the second tunnel to the next hop based on the same stored set of next hop operations.

In some embodiments, a network device receives information associated with a network topology of a network that includes a plurality of network devices. The network topology includes a first tunnel and a second tunnel. The first tunnel includes a first plurality of multipath routes. The second tunnel includes a second plurality of multipath routes. The network device further determines that the network device is an ingress of the first tunnel, the network device is an ingress of the second tunnel, and the first plurality of multipath routes and the second plurality of multipath routes share a plurality of possible next hops from the network device. Based on the determination, the network device also programs a set of hardware resources of the network device to store a set of next hop operations for each possible next hop in the plurality of possible next hops, forward a first incoming packet through the first tunnel to a first next hop in the plurality of possible next hops based on the stored sets of next hop operations, and forward a second incoming packet through the second tunnel to a second next hop in the plurality of possible next hops based on the same stored sets of next hop operations.

The following detailed description and accompanying drawings provide a better understanding of the nature and advantages of the present invention.

DETAILED DESCRIPTION

Figure 1:
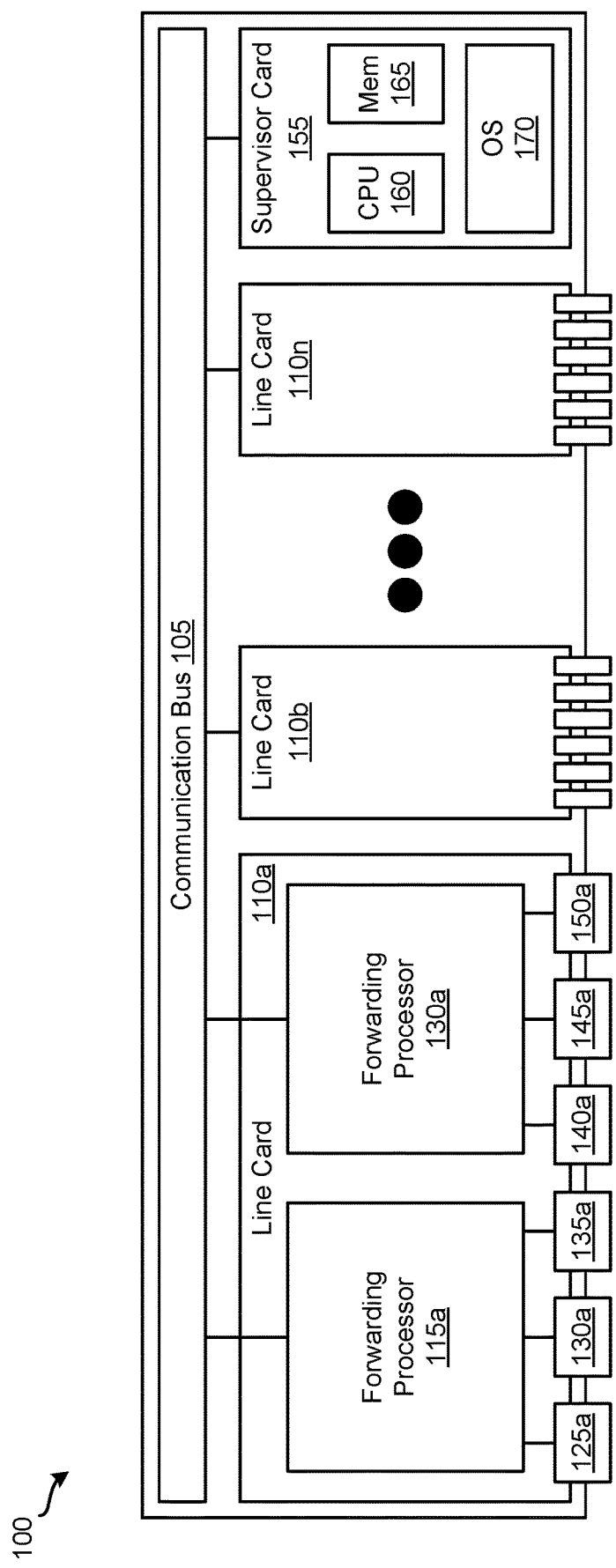
FIG. 1 illustrates an architecture of a network device according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for optimized programming of forwarding data in network device hardware. In some embodiments, an operating system executing on the network device receives information associated with a network topology of a network(s) to which the network device and other network devices belong and/or are communicatively coupled. Based on this information, the operating system can generate various data structures that facilitate the routing and forwarding of data through the network device. Examples of such data structures include a routing information base (RIB), a forwarding information base (FIB), a label information base (LIB), a label forwarding information base (LFIB), etc. Based on the generated data structures, the operating system may then program hardware resources in the network device in order to implement routing and forwarding operations stored in the data structures.

During generation of the data structures, the operating system can perform some operations to optimize the programing of the hardware resources in a manner that reduces the amount of hardware resources that would otherwise be used without such optimizations. For example, in some embodiments, the operating system may optimize the programming of label swap operations for MPLS routes into the hardware resources of a network device. For instance, when an MPLS route swaps the incoming label with the same outgoing label, the operating can may program the hardware resources to not perform the swap operation and just perform the packet forwarding. As another example, in some embodiments, the operating system may optimize the programming of ingress tunnels into the hardware resources of a network device. For instance, for ingress tunnels that share the same set of possible next hops, the operating system can program the hardware resources to share the same ECMP routes (also referred to as an ECMP set). This allows the hardware resources of the network device to use just one entry in the ECMP table instead of having separate, duplicate entries in the ECMP table for the same ECMP set. As yet another example, in some embodiments, the operating system may optimize the programming of label POP operations for MPLS routes into the hardware resources of the network device. For instance, for MPLS routes that perform a label POP operation and that share the same set of possible next hops, the operating system can program the hardware resources to share the same ECMP set. This allows the network device hardware to use just one entry in the ECMP table instead of having separate, duplicate entries in the ECMP for the same ECMP set.

The present disclosure describes multiple examples and embodiments directed at network topologies that include MPLS routes, MPLS PUSH operations, MPLS POP operations, MPLS labels, ECMP sets, etc. One of ordinary skill in the art will appreciate that the techniques described herein are applicable to network topologies that include additional and/or different types of routes (e.g., types of tunnels other than MPLS routes), tunnel encapsulation operations (e.g., types of tunnel encapsulation operations other than MPLS PUSH operations), encapsulation data swap operations (e.g., types of encapsulation data swap operations other than MPLS SWAP operations), tunnel decapsulation operations (e.g., types of tunnel decapsulation operations other than MPLS POP operations), encapsulation data (e.g., types of encapsulation data other than MPLS labels), multipath routes (e.g., types of multipath routes other than ECMP routes), etc.

1. Example Network Device

FIG. 1 illustrates an architecture of a network device 100 according to some embodiments. As shown, network device 100 includes communication bus 105, lines cards 110a-n and supervisor card 155. Line cards 110b-110n are not shown in the same level of detail as line card 110a for the purposes of simplicity and explanation. One of ordinary skill in the art will understand that line cards 110b-n may be implemented in the same or similar manner as that shown for line card 110a. Communication bus 105 is communicatively coupled to line cards 110a-n and supervisor 155 and is configured to facilitate communication among line cards 110a-n and supervisor 155. In some embodiments, communication bus 105 can be implemented using one or more fabric modules.

As illustrated in FIG. 1, lines card 110a includes forwarding processor 115a, ports 125a-135a communicatively coupled to forwarding processor 115a, forwarding processor 130a, and ports 140a-150a communicatively coupled to forwarding processor 130a. In some embodiments, forwarding processors 115a and 130a can be each implemented as one or more application-specific integrated circuits (ASICs). Ports 125a-135a and 140a-150a may be Ethernet ports in some embodiments.

Forwarding processor 115a is configured to process packets received through ports 125a-135a. For example, when forwarding processor 115a receives a packet through one of the ports 125a-135a, forwarding processor 115a examines the packet in order to determine where to forward the packet. In some instances, forwarding processor 115a may determine that the packet is to be forwarded out through one of the ports 125a-135a and, thus, sends it out of the determined port. In other instances, forwarding processor 115a can determine that the packet is to be forwarded out through one of the ports 140a-150a. In such other instances, forwarding processor 115a sends the packet to forwarding processor 130a via communication bus 105. In some cases, forwarding processor 115a may determine that the packet is to be forwarded out through a port on one of the other line cards 110b-n. In such cases, forwarding processor 115a sends the packet to the appropriate line card 110 via communication bus 105.

Similarly, forwarding processor 130a handles the processing of packets received through ports 140a-150a. For instance, upon receiving a packet through one of the ports 140a-150a, forwarding processor 130a examines the packet in order to determine where to forward the packet. Forwarding processor 115a can determine that the packet is to be forwarded out through one of the ports 140a-150a and sends it out of the determined port accordingly. Forwarding processor 130a may determine that the packet is to be forwarded out through one of the ports 125a-135a. In these instances, forwarding processor 130a sends the packet to forwarding processor 115a via communication bus 105. In other instances, forwarding processor 130a can determine that the packet is to be forwarded out through a port on one of the other line cards 110b-n. In such other instances, forwarding processor 130a sends the packet to the appropriate line card 110 via communication bus 105.

As shown in FIG. 1, supervisor card 155 includes central processing unit (CPU) 160, memory 165, and operating system (OS) 170. CPU 160 is configured to manage and/or control the operation of network device 100. In some embodiments, CPU 160 may be a general purpose processor, such as an Intel/AMD x86 or ARM-based processor, that operates under the control of software stored in memory 165. Memory 165 is configured to store software instructions (e.g., OS 170) for execution by CPU 160. Memory 165 can includes a number of memories including a main random access memory (RAM) for storing instructions and data during program execution and a read-only memory (ROM) for storing fixed instructions. Supervisor card 155 may also include a file storage system (not shown) for providing persistent (i.e., non-volatile) storage of program and data files (e.g., OS 170) and can include a magnetic or solid-state hard disk drive, an optical drive along with associated removable media (e.g., CD-ROM, DVD, Blu-Ray, etc.), a removable flash memory-based drive or card, and/or other types of storage media known in the art.

OS 170 is a software program executable on network device 100 that performs a variety of functions for facilitating the operation of network device 105. For example, OS 170 executes one or more routing protocols (e.g., border gateway protocol (BGP), open shortest path first (OSPF), intermediate system to intermediate system (IS-IS), etc.) to discover the network topology of the network(s) to which network device 100 belongs and/or communicatively coupled. OS 170 may generate the various data structures mentioned above (e.g., a RIB, a (FIB), a (LIB), a (LFIB), etc.) for facilitating the routing and forwarding of data (e.g., network packets) through network device 100. Based on the generated data structures, OS 170 programs hardware resources in the network device (e.g., forwarding processor 115a, forwarding processor 130a, and forwarding processor in line cards 110b-110n) in order to implement routing and forwarding operations stored in the data structures.

FIG. 1 illustrates an example of a network device that can be used to implement various embodiments of the present invention. One of ordinary skill in the art will appreciate that many other configurations of network device 100 having additional and/or different components are possible. For example, a line card may include more than two forwarding processors, a line card may include more than six ports, a forwarding processor may be communicatively coupled to more than three ports, network device 100 may include more than one supervisor card, etc.

1.1 Example Forwarding Processor

Figure 2:
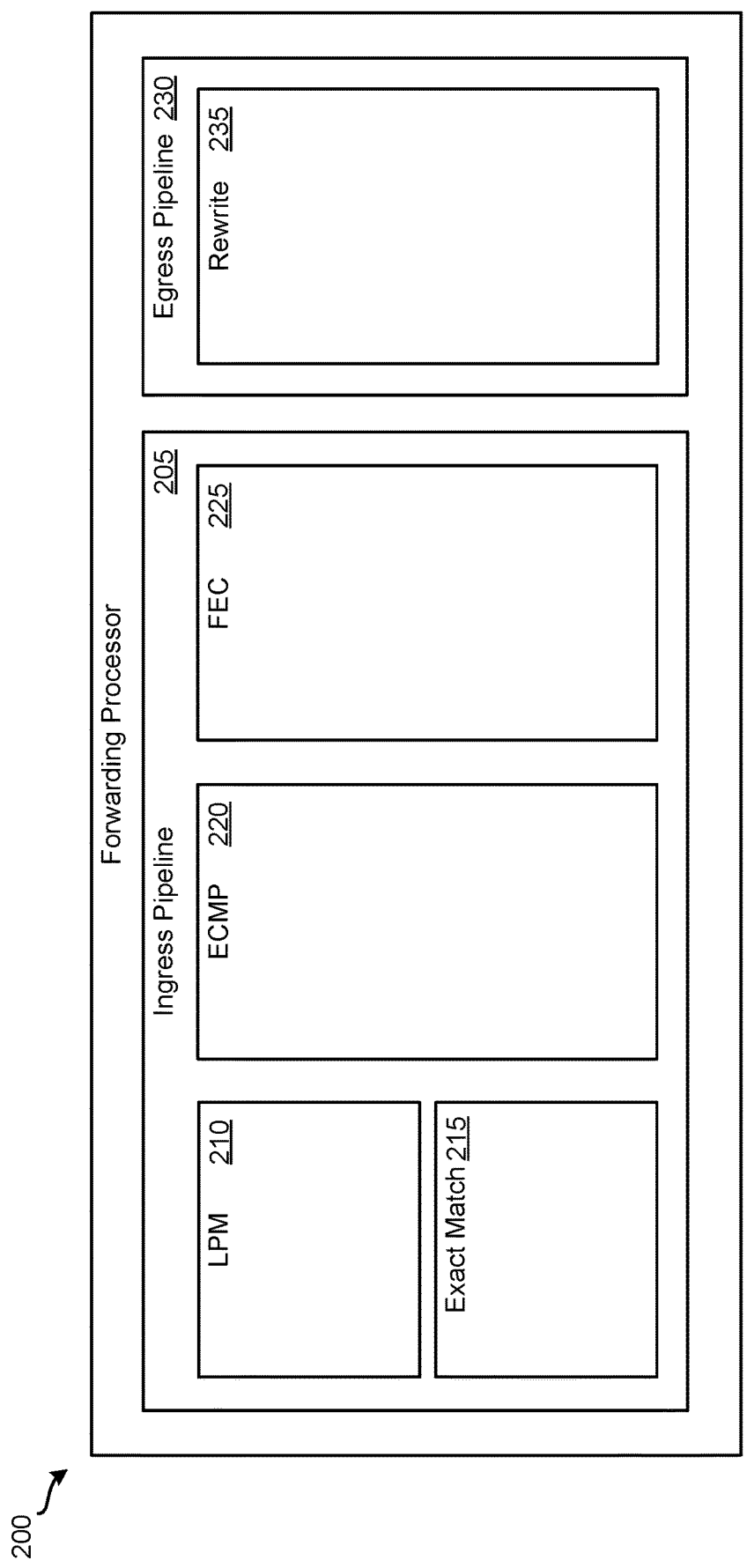
FIG. 2 illustrates an architecture of a forwarding processor according to some embodiments.

FIG. 2 illustrates an architecture of a forwarding processor 200 according to some embodiments. In some embodiments, forwarding processor 200 may be used to implement forwarding processor 115a, forwarding processor 130a, and the forwarding processors in line cards 110b-110n. In some embodiments, forwarding processor 200 is implemented by one or more ASICs. As shown, forwarding processor 200 includes ingress pipeline 205 and egress pipeline 230. Ingress pipeline 205 and egress pipeline 230 are used collectively to process and forward data (e.g., network packets).

Ingress pipeline 205 is configured to process packets received at ports (not shown) coupled to forwarding processor 200 (e.g., ports 125a-135a of forwarding processor 115a) in order to determine where to forward the packets. As illustrated in FIG. 2, ingress pipeline 205 includes a longest prefix match (LPM) storage 210, exact match storage 215, equal cost multipath (ECMP) storage 220 and forwarding equivalence class (FEC) storage 225. In some embodiments, LPM storage 210, exact match storage 215, ECMP storage 220, and FEC storage 225 are each implemented as one or more tables.

LPM storage 210 is configured to store a number of different routes. For instance, LPM storage 210 can store 32-bit prefix match routes, 24-bit prefix match routes, 16-bit prefix match routes, 8-bit prefix match routes, 0-bit prefix match routes (also referred to as default prefix match routes), or any combination thereof. LPM storage 210 may be used to perform exact match lookups.

Exact match storage 215 is responsible for storing exact match routes. Examples of such routes include Internet Protocol version 4 (IPv4) routes, IP version 6 (IPv6) routes, MAC addresses, and MPLS labels. In some embodiments, an exact match route specifies 32-bit prefix matches (e.g., IPv4 exact match routes), 128-bit prefix matches (e.g., IPv6 exact match routes), 48-bit prefix matches (e.g., MAC address prefix matches), 20-bit prefix matches (e.g., MPLS label prefix matches), or a combination thereof. Exact match storage 215 can be used to perform variable length prefix lookups.

ECMP storage 220 is configured to store ECMP entries. In some embodiments, an ECMP entry can be used to encode an ECMP set that includes several paths to a destination where each of the paths to the destination have the same equal cost. FEC storage 225 handles the storage of next hop entries. In some embodiments, FEC storage 225 provides the ability to implement hierarchies of FEC tables in FEC storage 225. ECMP storage 220 and FEC storage 225 may be implemented using a single table in some embodiments. In other embodiments, ECMP storage 220 and/or FEC storage 225 may be implemented across multiple tables.

Egress pipeline 230 is configured to perform modifications to packets to be forwarded. For example, egress pipeline 230 may be responsible for rewriting packets (e.g., rewriting network host addresses (e.g., media access control (MAC) addresses), encapsulating packets (e.g., multiprotocol label switching (MPLS) PUSH label operations), decapsulating packets (e.g., MPLS POP label operations), etc. As shown in FIG. 1, egress pipeline 230 includes rewrite storage 235. Rewrite storage 235 is configured to store instructions for modifying packets and forwarding packets.

2. Ingress Tunnel Optimization

This section will describe an example of optimizing the programming of ingress tunnels into the hardware resources of a network device (e.g., network device 100). The section will begin by describing an example network topology, followed by example logical architectures for implementing the network topology into the hardware resources of the network device, and ends with a process for programming the hardware resources of a network device.

2.1 Example Network Topology

Figure 3:
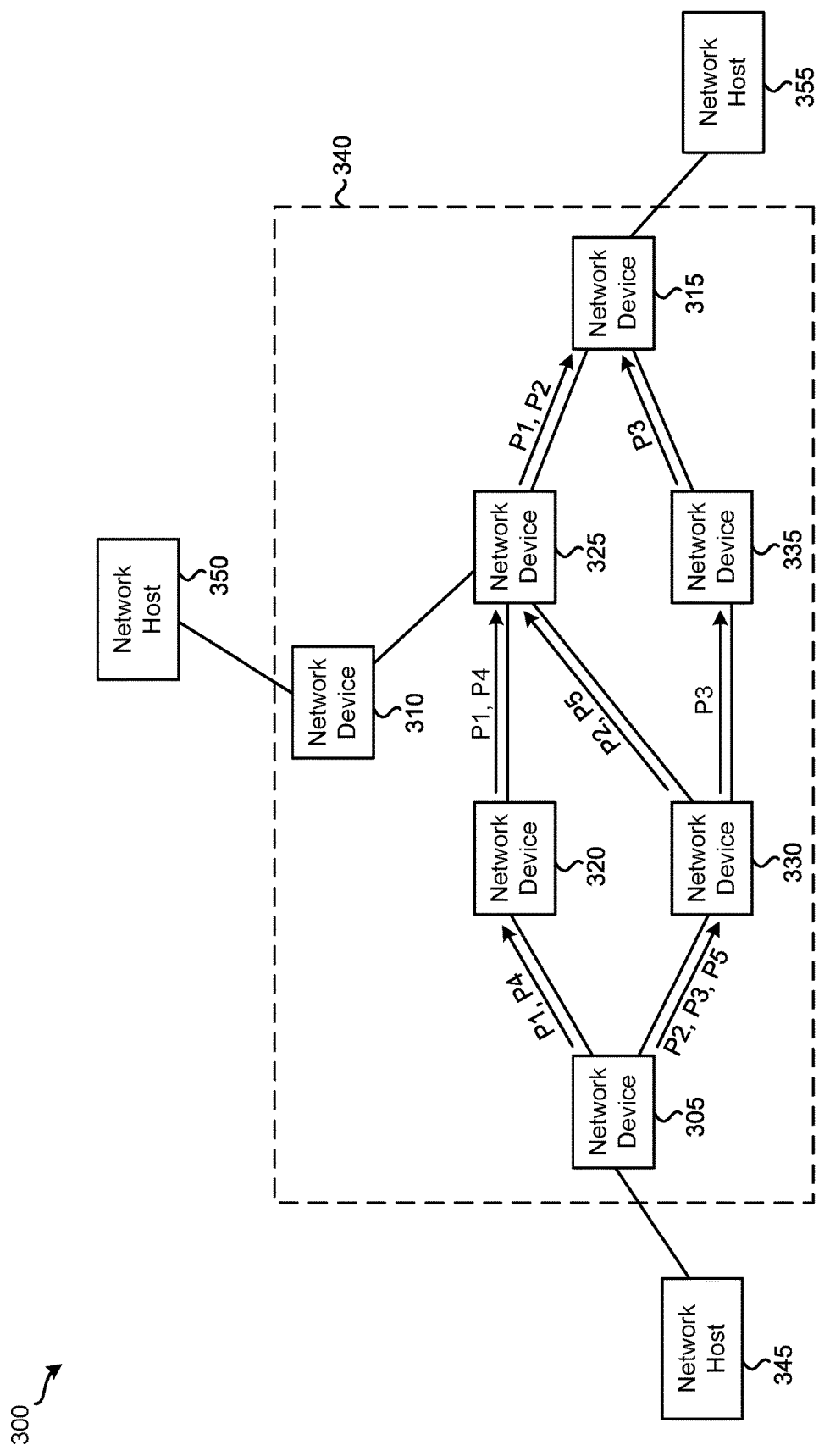
FIG. 3 illustrates an example network topology according to some embodiments.

FIG. 3 illustrates an example network topology 300 according to some embodiments. As shown, network topology 300 includes network 340 and network hosts 345-355. Network hosts 345-355 are communicatively coupled to one another via network 340. Each of the network hosts 345-355 may be a computing device (e.g., a desktop computer, a laptop, a smartphone, a tablet, a server, etc.) a configured to send data to and receive data from each other via network 340. In this example, network 340 is an MPLS network. As illustrated, network 340 includes network devices 305-335. Each of the network devices 305-335 can be a network switch and/or a network router configured to process and forward data through network 340. For example, each of the network devices 305-335 may be implemented by network device 100.

As shown in FIG. 3, network 340 includes two ECMP sets. A first ECMP set starts from network device 305 and ends at network device 315 and has three possible paths. A second ECMP set starts from network device 305 and ends at network device 325 and has two possible paths. In the first ECMP set, a first path (P1) starts from network device 305, traverses through network devices 320 and 325, and ends at network device 315. A second path (P2) in the first ECMP set starts from network device 305, traverses through network devices 330 and 325, and ends at network device 315. A third path (P3) in the first ECMP set starts from network device 305, traverses through network devices 330 and 335, and ends at network device 315. For the second ECMP set, a first path (P4) starts from network device 305, traverses through network device 320, and ends at network device 325. A second path (P5) in the second ECMP set starts from network device 305, traverses through network device 330, and ends at network device 325.

In addition, for this example, network topology 300 includes two MPLS routes (not shown). A first MPLS route starts at network device 305 and ends at network device 315 and is assigned an MPLS label L1. The first MPLS route is for transporting packets originating from network host 345 and destined for network host 355. Also, the first MPLS route includes the first ECMP set. Thus, three different paths, each having the same cost, from network device 305 to network device 315 can be used to transmit data through the first MPLS route. A second MPLS route starts at network device 305 and ends at network device 310 and is assigned an MPLS label L2. The second MPLS route is for transporting packets originating from network host 345 and destined for network host 350. In addition, the second MPL route includes the second ECMP set. Therefore, two different paths, each having the same cost, from network device 305 to network device 325 may be used to transmit data through the second MPLS route. MPLS routes may also be referred to as MPLS tunnels and the start and end of an MPLS tunnel may also be referred to as endpoints of the MPLS tunnel.

2.2 Example Logical Architecture

Figure 4A:
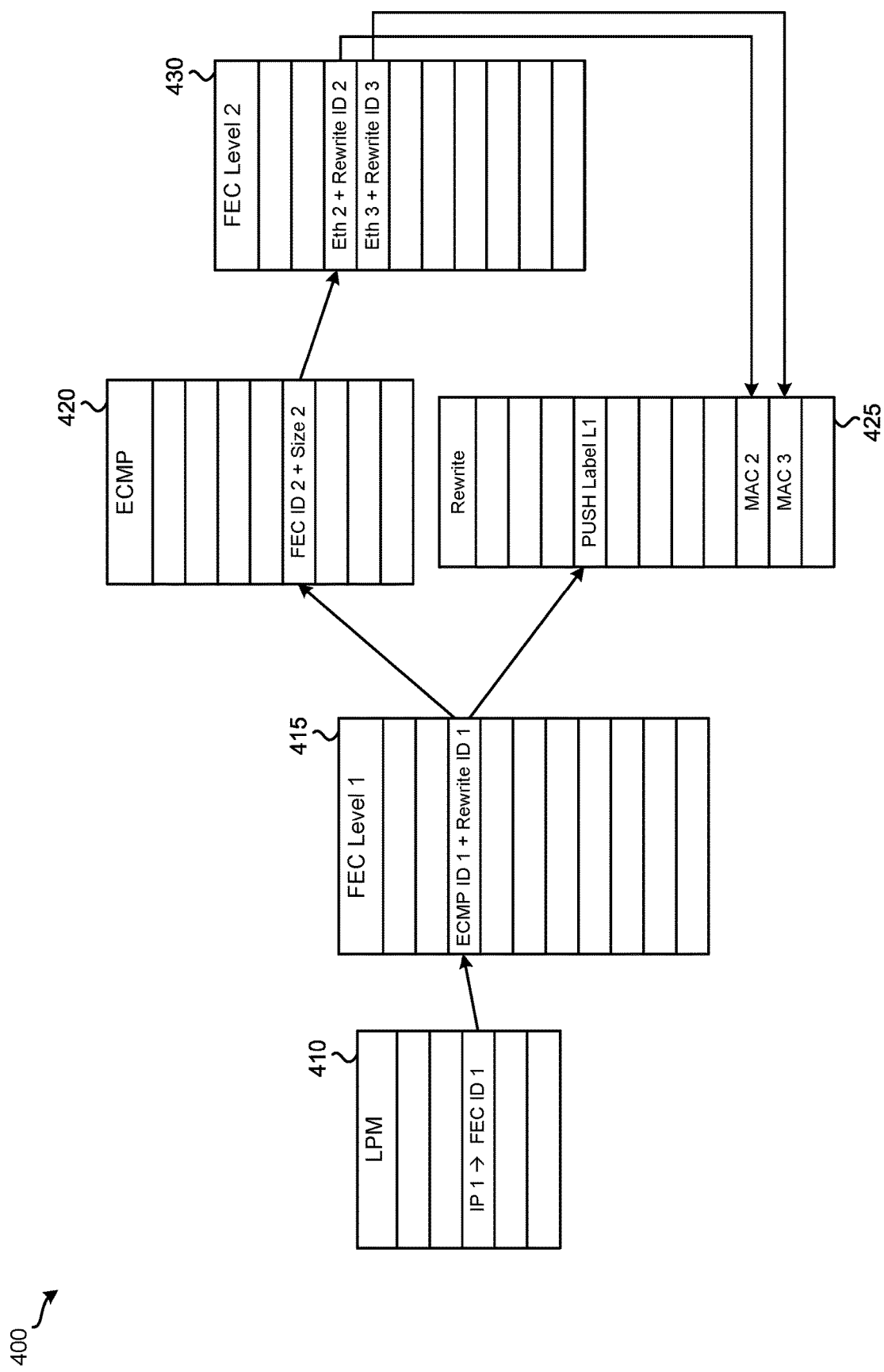
FIGS. 4A and 4B illustrate a logical architecture for implementing the network topology illustrated in FIG. 3 in a network device according to some embodiments.
Figure 4B:
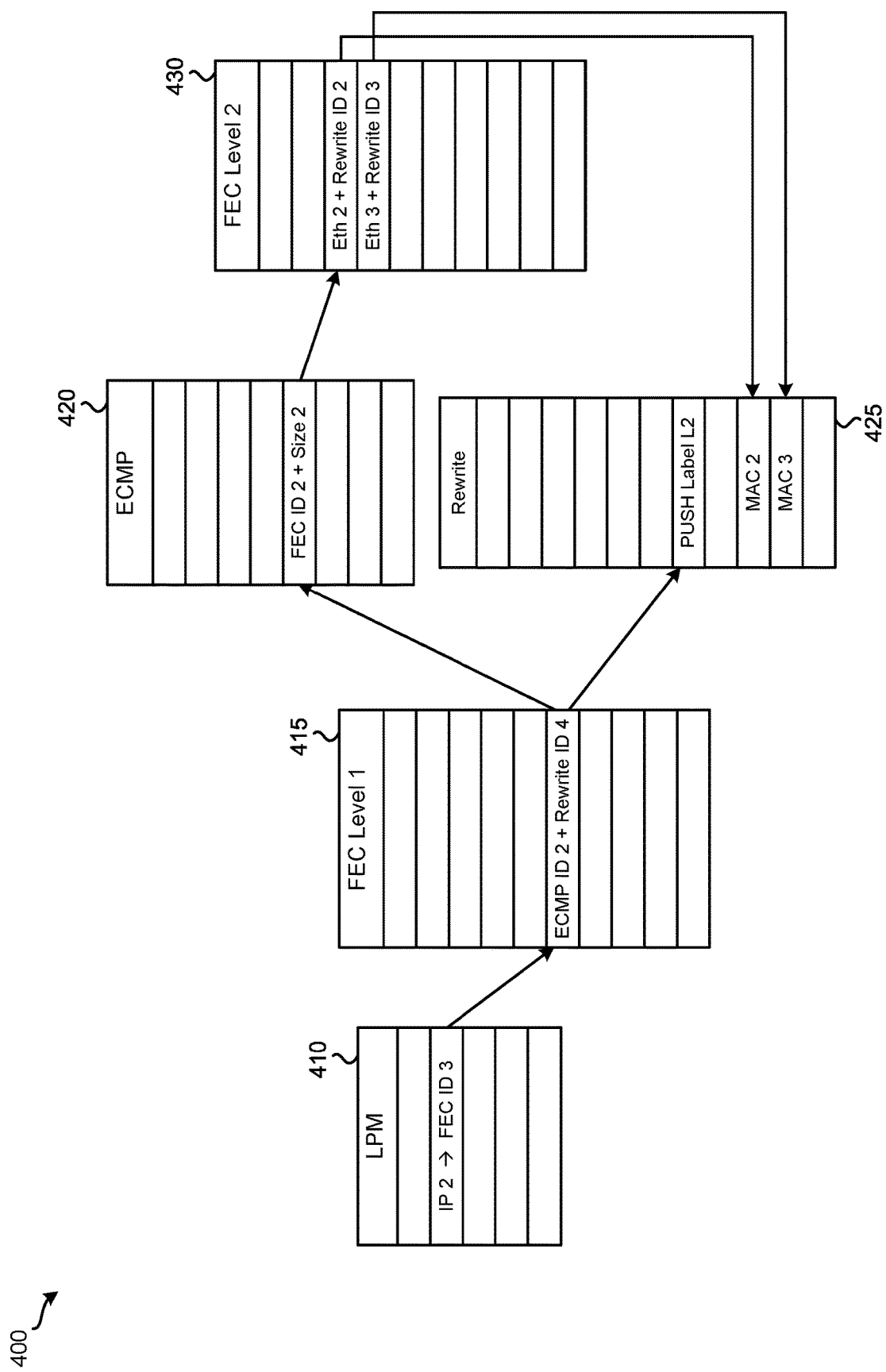

FIGS. 4A and 4B illustrate a logical architecture 400 for implementing network topology 300 in a network device according to some embodiments. In particular, logical architecture 400 is used to implement network topology 300 in network device 305. As described above by reference to FIG. 3, the first and second MPLS routes in MPLS network 340 start at network device 305. Thus, network device 305 is the ingress network device of the first and second MPLS routes. As shown in FIG. 3, network device 305 is operating at the edge of MPLS network 340 and serves as the entry and exit points of MPLS network 340. As an edge network device of MPLS network 340, network device 305 may be configured to encapsulate data (e.g., IP data) with MPLS labels for transmission through MPLS network 340 and decapsulate data exiting MPLS network 340 (e.g., by stripping MPLS labels from the encapsulated data). A network device operating at the edge of an MPLS network may also be referred to as a label edge router (LER). For this example, network device 100 and forwarding processor 200 are used to implement network device 305.

The example operation starts by OS 170 of network device 305 executing a set of routing protocols one or more routing protocols (e.g., border gateway protocol (BGP), open shortest path first (OSPF), intermediate system to intermediate system (IS-IS), etc.) to discover network topology 300. Once OS 170 of network device 305 receives information associated with network topology 300 from the execution of the set of routing protocols, OS 170 generates a set of data structures that facilitate the routing and forwarding of data through network device 305. One data structure in the set of data structures is a FIB.

In this example, the port on network device 305 communicatively coupled to network host 345 is a first port (Eth 1), the port on network device 305 communicatively coupled to network device 320 is a second port (Eth 2), and the port on network device 305 communicatively coupled to network device 330 is a third port (Eth 3). Thus, the FIB in this example includes a first entry for forwarding data to network host 355 that specifies a mapping between data received having a destination IP that matches the IP address of network host 355 (e.g., a 32-bit prefix matching the IP address of network host 355) and a set of egress ports Eth 2 or Eth 3 and a PUSH label L1 operation. The first entry in the FIB may be conceptually illustrated by the following:

$IP_{355}$→Eth 2 or Eth 3; PUSH L1 where the $IP_{355}$ is the IP address of network host 355 and PUSH L1 is an operation that encapsulates a packet with an MPLS label L1 (e.g., inserts the MPLS label L1 into the packet). That is, the first entry is specifying that an MPLS label L1 be inserted into any packets received and destined for network host 355 and that the packet is to be forwarded out of either Eth 2 or Eth 3. The FIB also includes a second entry for forwarding data to network host 350 that specifies a mapping between data having a destination IP that matches the IP address of network host 350 (e.g., a 32-bit prefix matching the IP address of network host 350) and a set of egress ports Eth 2 or Eth 3 and a PUSH label L2 operation. The second entry in the FIB can be conceptually illustrated by the following:

$IP_{350}$→Eth 2 or Eth 3; PUSH L2 where the $IP_{350}$ is the IP address of network host 350 and PUSH L2 is an operation that encapsulates a packet with an MPLS label L2 (e.g., inserts the MPLS label L2 into the packet). In other words, the second entry is specifying that an MPLS label L2 be inserted into any packets received and destined for network host 350 and that the packet is to be forwarded out of either Eth 2 or Eth 3.

When OS 170 is generating the FIB, OS 170 determines, based on the information associated with network topology 300, that network device 305 is the ingress of the first and second MPLS routes and that the set of possible next hops from network device 305 in the first ECMP set of the first MPLS route (i.e., network device 320 for path P1 and network device 330 for paths P2 and P3) are the same as the set of possible next hops from network device 305 in the second ECMP set of the second MPLS route (i.e., network device 320 for path P4 and network device 330 for path P5). For this example, OS 170 implements the first and second MPLS routes in the hardware resources of network device 305 in a manner that uses the same set of possible next hops from network device 305.

Logical architecture 400 illustrates how OS 170 implements the first and second MPLS routes in such a manner. Specifically, logical architecture 400 in FIG. 4A shows how OS 170 implements the first MPLS route in network topology 300 and logical architecture 400 in FIG. 4B shows how OS 170 implements the second MPLS route in network topology 300. As illustrated in FIG. 4A, logical architecture 400 includes LPM 410, FEC level 1 415, ECMP 420, rewrite 425, and FEC level 2 430. In some embodiments, LPM 410, FEC level 1 415, ECMP 420, rewrite 425, and FEC level 2 430 are software data structures generated and managed by OS 170 in order to implement the first and second MPLS routes, among other routes, in network topology 300 for network device 305. These data structures correspond to the hardware resources shown in forwarding processor 200 and, thus, serve the same or similar functions as their hardware counterparts. In particular, LPM 410 corresponds to LPM storage 210, ECMP 420 corresponds to ECMP storage 220, rewrite 425 corresponds to rewrite storage 235, and FEC level 1 415 and FEC level 2 430, collectively, correspond to FEC storage 225.

For this example, the third entry in LPM 410 of FIG. 4A specifies a mapping between data received having the IP address of network host 355 (IP 1) and a pointer (FEC ID 1) to the third entry in FEC level 1 415. The third entry in FEC level 1 415 includes two pointers: a first pointer (ECMP ID 1) to the fifth entry in ECMP 420 and a second pointer (rewrite ID 1) to the fourth entry in rewrite 425. The fourth entry of rewrite 425 stores a PUSH label L1 operation for encapsulating a packet with an MPLS label L1. The fifth entry in ECMP 420 encodes the first ECMP set in network topology 300. As shown, the fifth entry in ECMP 420 includes a pointer (FEC ID 2) to the third entry in FEC level 2 430 and a size attribute of two. In this example, FEC level 2 430 stores next hop entries. The pointer to FEC level 2 430 and the size attribute are used collectively to specify the possible next hops that are included in the first ECMP set. Specifically, the pointer to FEC level 2 430 specifies the first next hop included in the first ECMP set and the size attribute specifies the total number of next hops included in the first ECMP set. Since the value of the size attribute is "2" in this example, the next hops specified in the third and fourth entries of FEC level 2 430 are included in the first ECMP set. As shown, the third entry of FEC level 2 430 includes a port Eth 2 and a pointer (rewrite ID 2) to the ninth entry in rewrite 425 and the fourth entry of FEC level 2 430 includes a port Eth 3 and a pointer (rewrite ID 3) to the tenth entry in rewrite 425. A port in an entry of FEC level 2 430 may be used to determine which forwarding processor (e.g., forwarding processor 115a, forwarding processor 130a, etc.) will be used to modify and forward a packet. The forwarding processor that is determined can be the one that includes the specified port. A pointer in an entry of FEC level 2 430 specifies an entry in the rewrite storage of the determined forwarding processor.

In this example, network device 320 has a MAC address of MAC 2 and network device 330 has a MAC address of MAC 3. The ninth entry in rewrite 425 stores a MAC rewrite operation for rewriting the destination MAC address of a packet with the MAC address of network device 320. The tenth entry in rewrite 425 stores a MAC rewrite operation for rewriting the destination MAC address of a packet with the MAC address of network device 330.

As mentioned above, logical architecture 400 in FIG. 4B shows how OS 170 implements the second MPLS route in network topology 300. In this example, the second entry in LPM 410 of FIG. 4B specifies a mapping between data received having the IP address of network host 350 (IP 2) and a pointer (FEC ID 3) to the sixth entry in FEC level 1 415. The sixth entry in FEC level 1 415 includes two pointers: a first pointer (ECMP ID 2) to the fifth entry in ECMP 420 and a second pointer (rewrite ID 4) to the seventh entry in rewrite 425. As shown in FIG. 4B, the first pointer of the sixth entry in FEC level 1 415 points to the same entry (the fifth entry) in ECMP 420 as the first pointer in the third entry of FEC level 1 415 illustrated in FIG. 4A. The seventh entry of rewrite 425 stores a PUSH label L2 operation for encapsulating a packet with an MPLS label L2. The fifth entry in ECMP 420 is also used to encode the second ECMP set in network topology 300 because the set of possible next hops in the second ECMP set are the same as the set of possible next hops in the first ECMP set.

As explained above, FEC storage 225 provides the ability to implement hierarchies of FEC tables in FEC storage 225 in some embodiments. As shown in FIGS. 4A and 4B, OS 170 leverages this ability to share sets of packet rewrite operations that have the same packet rewrite operations by separating the label operations from the packet rewrite operations. This way, different MPLS routes with the same set of possible next hops can be programmed to share the same set of possible next hops, thereby preventing unnecessary duplicate sets of possible next hops from being programmed into the hardware resources of network device 305 and additionally optimizing the usage of hardware resources in network device 305.

Logical architecture 400 illustrated in FIGS. 4A and 4B is programmed into the corresponding hardware resources illustrated in FIG. 2 of network device 305 in order to implement network topology 300 in network device 305. For this example, logical architecture 400 is programmed into the forwarding processor 200 that includes port Eth 1, the forwarding processor 200 that includes port Eth 2, and the forwarding processor 200 that includes port Eth 3. In particular, for the forwarding processor 200 that includes port Eth 1, LPM 410 is programmed into LPM storage 210, FEC level 1 415 is programmed into FEC storage 225, ECMP 420 is programmed into ECMP storage 220, the fourth and seventh entries in rewrite 425 are programmed into rewrite storage 235, and FEC level 2 is programmed into FEC storage 225. For the forwarding processor 200 that includes Eth 2, the ninth entry in rewrite 425 is programmed into rewrite storage 235. For the forwarding processor 200 that includes Eth 3, the tenth entry in rewrite 425 is programmed into rewrite storage 235. As mentioned above, in some embodiments, FEC storage 225 can be implemented across multiple tables. In some such embodiments, FEC level 1 415 can be implemented in a first table while FEC level 2 430 can be implemented in a second table.

After network device 305 is programmed, the forwarding processor 200 that includes port Eth 1 may receive from network host 345 a first packet containing the IP address of network host 355 as the destination IP of the first packet. In response to receiving the first packet, ingress pipeline 205 performs a lookup on LPM storage 210 using the destination IP address of the first packet. The identified entry in LPM storage 210 contains a pointer to an entry in FEC storage 225, which includes a pointer to an entry in ECMP storage 220 and a pointer to an entry in rewrite storage 235. The pointer to the entry in rewrite storage 235 stores a PUSH label L1 operation that egress pipeline 230 uses to encapsulate the first packet with an MPLS label L1. The entry in ECMP storage 220 encodes the two possible next hops for the first ECMP set in network topology 300. Ingress pipeline 205 generates a hash value based on a 5-tuple (e.g., the source IP, the destination IP, the source port, the destination port and protocol) of data specified in the first packet. Then ingress pipeline 205 selects, based on the hash value, one of the two possible next hops encoded by the entry in ECMP storage 220 by selecting one of the two entries in FEC storage 225 encoded by the entry in ECMP storage 220. Next, ingress pipeline 205 determines the forwarding processor (e.g., forwarding processor 115a, forwarding processor 130a, etc.) that includes the port specified in the selected entry in FEC storage 225. If the determined forwarding processor is different than the forwarding processor that includes port Eth 1, ingress pipeline 205 sends the first packet to the determined forwarding processor via communication bus 105. The egress pipeline 230 of the determined forwarding processor performs a packet rewrite operation on the first packet based on a set of packet rewrite operations specified in the entry referenced in rewrite storage 235 by the pointer included in the selected entry of FEC storage 225 in order to rewrite the destination MAC address of the first packet with the MAC address of the network device at the next hop (e.g., the MAC address of network device 320 or the MAC address of network device 330). Finally, the egress pipeline 230 of the determined forwarding processor forwards the first packet out of the specified port (e.g., Eth 2 or Eth 3) of network device 305 specified in the referenced entry in rewrite storage 235.

The forwarding processor 200 programmed with logical architecture 400 can also receive from network host 345 a second packet containing the IP address of network host 350 as the destination IP of the second packet. Upon receiving the second packet, ingress pipeline 205 performs a lookup on LPM storage 210 using the destination IP address of the second packet. The identified entry in LPM storage 210 contains a pointer to an entry in FEC storage 225, which includes a pointer to the same entry in ECMP storage 220 used to process the first packet described above as well as a pointer to an entry in rewrite storage 235. The pointer to the entry in rewrite storage 235 stores a PUSH label L2 operation that egress pipeline 230 uses to encapsulate the second packet with an MPLS label L2. The entry in ECMP storage 220 also encodes the two possible next hops for the second ECMP set in network topology 300. Ingress pipeline 205 generates a hash value based on a 5-tuple (e.g., the source IP, the destination IP, the source port, the destination port and protocol) of data specified in the second packet. Based on the hash value, ingress pipeline 205 selects one of the two possible next hops encoded by the entry in ECMP storage 220 by selecting one of the two entries in FEC storage 225 encoded by the entry in ECMP storage 220. Ingress pipeline 205 then determines the forwarding processor (e.g., forwarding processor 115a, forwarding processor 130a, etc.) that includes the port specified in the selected entry in FEC storage 225. If the determined forwarding processor is different than the forwarding processor that includes port Eth 1, ingress pipeline 205 sends the second packet to the determined forwarding processor via communication bus 105. Next, the egress pipeline 230 of the determined forwarding processor performs a packet rewrite operation on the second packet based on a set of packet rewrite operations specified in the entry referenced in rewrite storage 235 by the pointer included in the selected entry of FEC storage 225 in order to rewrite the destination MAC address of the second packet with the MAC address of the network device at the next hop (e.g., the MAC address of network device 320 or the MAC address of network device 330). Egress pipeline 230 then forwards the second packet out of the specified port (e.g., Eth 2 or Eth 3) of network device 305 specified in the referenced entry in rewrite storage 235.

2.3 Example Process for Programming Hardware Resources

Figure 5:
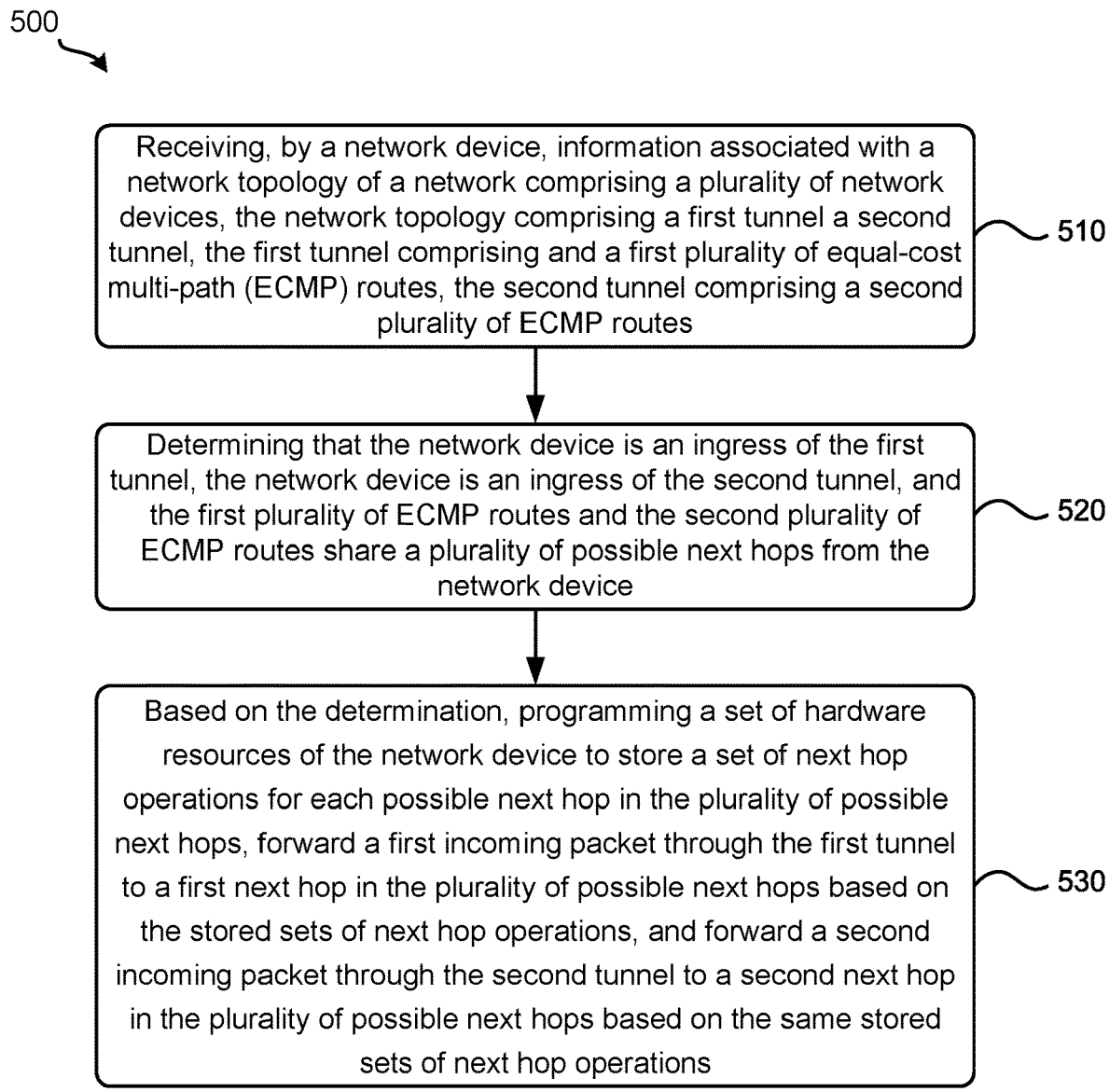
FIG. 5 illustrates a process for programming hardware of a network device according to some embodiments.

FIG. 5 illustrates a process 500 for programming hardware of a network device according to some embodiments. In some embodiments, a network device (e.g., network device 305) may perform process 500. Process 500 begins by a network device receiving, at 510, information associated with a network topology of a network comprising a plurality of network devices. The network topology comprises a first tunnel and a second tunnel. The first tunnel comprises a first plurality of equal-cost multi-path (ECMP) routes and the second tunnel comprises a second plurality of ECMP routes. Referring to FIG. 3 as an example, network device 305 may receive information associated with network topology 300. As described above, network topology 300 includes two MPLS tunnels. The first MPLS tunnel includes a first ECMP set that starts from network device 305 and ends at network device 315 and has three possible paths (P1-P3). The second MPLS tunnel includes a second ECMP set that starts from network device 305 and ends at network device 325 and has two possible paths (P4 and P5).

Next, process 500 determines, at 520, that the network device is an ingress of the first tunnel, the network device is an ingress of the second tunnel, and the first plurality of ECMP routes and the second plurality of ECMP routes share a plurality of possible next hops from the network device. Referring to the FIG. 3 as an example, network device 305 determines that it is an ingress of the first MPLS tunnel, it is an ingress of the second MPLS tunnel, and the first ECMP set included in the first MPLS tunnel and the second ECMP set included in the second MPLS tunnel share the same set of possible next hops from network device 305.

Based on the determination, process 500 then programs, at 530, a set of hardware resources of the network device to store a set of next hop operations for each possible next hop in the plurality of possible next hops, forward a first incoming packet through the first tunnel to a first next hop in the plurality of possible next hops based on the stored sets of next hop operations, and forward a second incoming packet through the second tunnel to a second next hop in the plurality of possible next hops based on the same stored sets of next hop operations. Referring to FIGS. 3, 4A, and 4B as an example, network device 305 programs hardware resources in a forwarding processor of network device 305 with the logical architecture 400 shown in FIGS. 4A and 4B in order to implement network topology 300 in network device 305. Once programmed, network device 305 can forward packets received from network host 345 and destined for network host 350 using the same set of possible next hops stored in the hardware resources of network device 305 as that used to forward packets received from network host 345 and destined for network host 355.

FIGS. 3-5 illustrate examples and embodiments directed at MPLS tunnels. One of ordinary skill in the art will realize that programming hardware resources of a network device to share a common set of possible next hops may be applicable to additional and/or different types of tunnels as well as IP routes. For example, a common set of possible next hops may be programmed to be shared between MPLS tunnels, generic routing encapsulation (GRE) tunnels, IP routes, etc., that include ECMP sets having the same common set of possible next hops.

3. MPLS Label Swap Optimization

This next section describes an example of optimizing the programming of MPLS label-switched paths (LSPs) into the hardware resources of a network device (e.g., network device 100). The section begins by describing an example network topology, followed by example logical architectures for implementing the network topology into the hardware resources of the network device, and ends with a process for programming the hardware resources of a network device.

3.1 Example Network Topology

Figure 6:
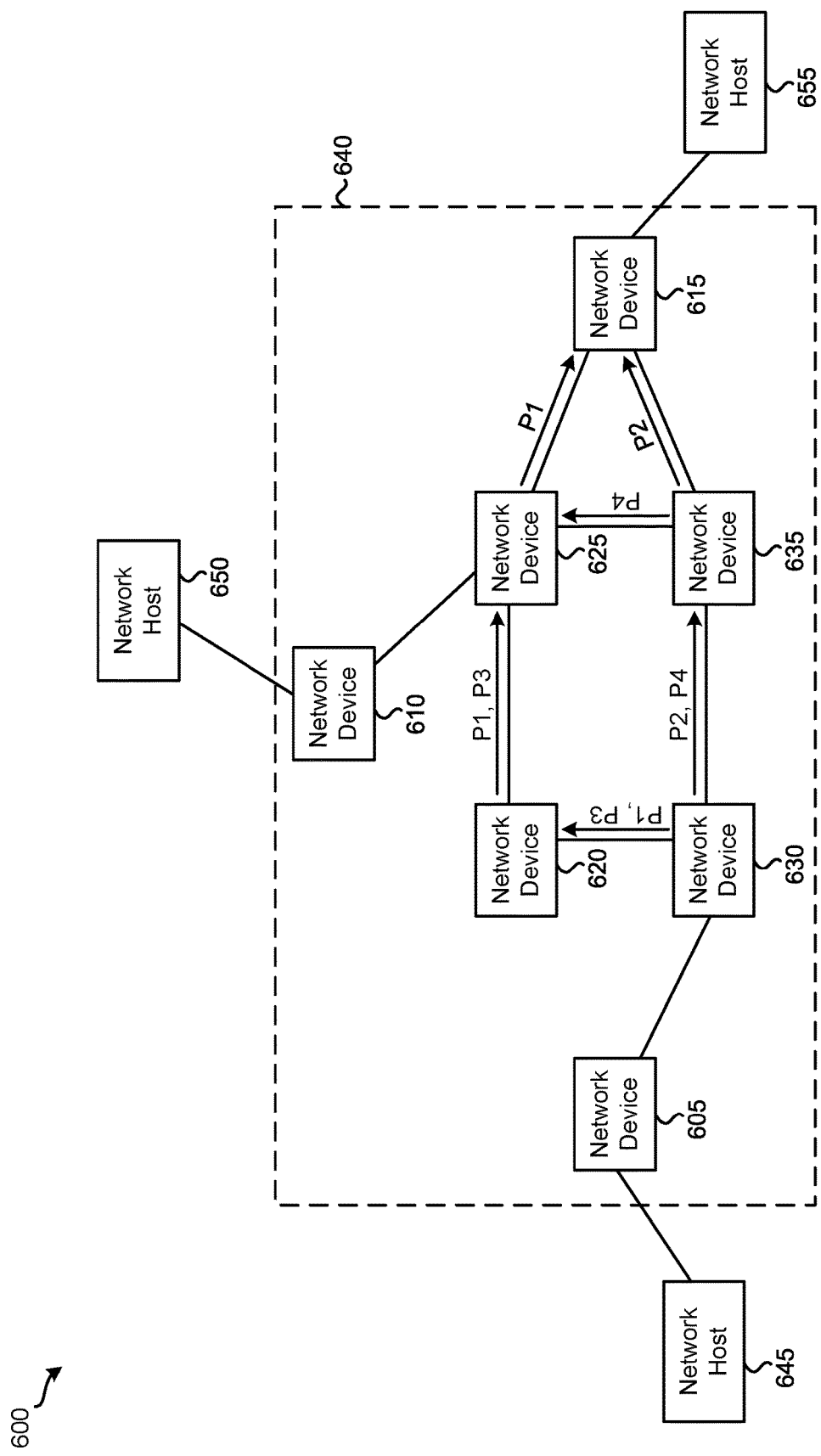
FIG. 6 illustrates another example network topology according to some embodiments.

FIG. 6 illustrates an example network topology 600 according to some embodiments. As illustrated, network topology 600 includes network 640 and network hosts 645-655. Network hosts 645-655 are communicatively coupled to one another via network 640. Network hosts 645-655 can each be a computing device (e.g., a desktop computer, a laptop, a smartphone, a tablet, a server, etc.) a configured to send data to and receive data from each other via network 640. In this example, network 640 is an MPLS network. As shown in FIG. 6, network 640 includes network devices 605-635. Each of the network devices 605-635 can be a network switch and/or a network router configured to process and forward data through network 640. For instance, each of the network devices 605-635 may be implemented by network device 100.

FIG. 6 illustrates that network 640 includes two ECMP sets. A first ECMP set starts from network device 630 and ends at network device 615 and has two possible paths. A second ECMP set starts from network device 630 and ends at network device 625 and has two possible paths. In the first ECMP set, a first path (P1) starts from network device 630, traverses through network devices 620 and 625, and ends at network device 615. A second path (P2) in the first ECMP set starts from network device 630, traverses through network device 635, and ends at network device 615. The second ECMP set includes a first path (P3) that starts from network device 630, traverses through network device 620, and ends at network device 625. A second path (P4) in the second ECMP set starts from network device 630, traverses through network device 635, and ends at network device 625.

In this example, network topology 600 also includes two MPLS routes (not shown). A first MPLS route starts at network device 605 and ends at network device 615 and is assigned an MPLS label L1. The first MPLS route is for transporting packets originating from network host 645 and destined for network host 655. Additionally, the first MPLS route includes the first ECMP set. Thus, two different paths, each having the same cost, from network device 630 to network device 615 may be used to transmit data through the first MPLS route. A second MPLS route starts at network device 605 and ends at network device 610 and is assigned an MPLS label L2. The second MPLS route is for transporting packets originating from network host 645 and destined for network host 650. The second MPL route also includes the second ECMP set. Hence, two different paths, each having the same cost, from network device 630 to network device 625 can be used to transmit data through the second MPLS route.

3.2 Example Logical Architecture

Figure 7A:
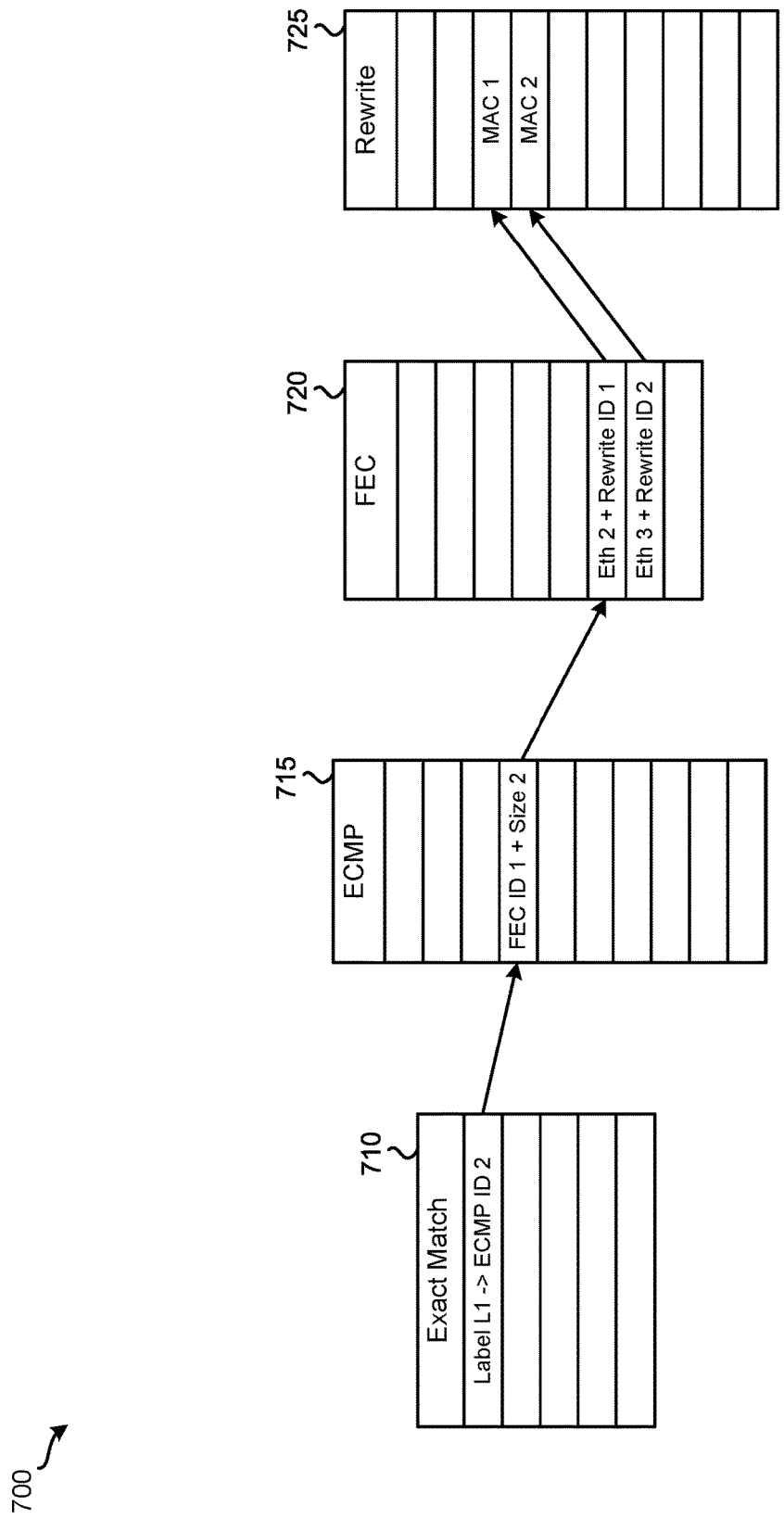
FIGS. 7A and 7B illustrate a logical architecture for implementing the network topology illustrated in FIG. 6 in a network device according to some embodiments.
Figure 7B:
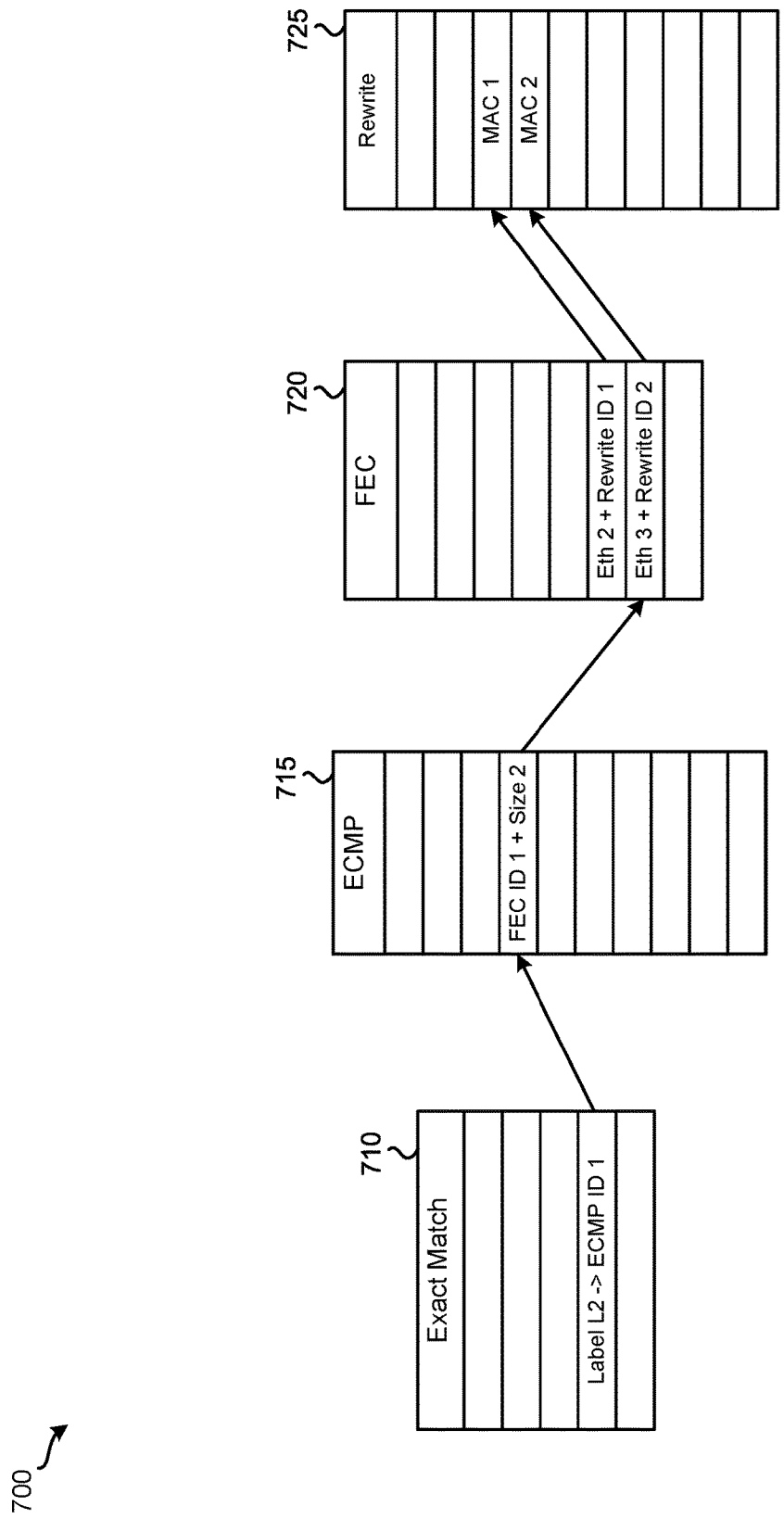

FIGS. 7A and 7B illustrate a logical architecture 700 for implementing network topology 600 in a network device according to some embodiments. Specifically, logical architecture 700 is used to implement network topology 600 in network device 630. As explained above by reference to FIG. 6, the first MPLS route in MPLS network 640 starts at network device 605 and ends at network device 615 and the second MPLS route in MPLS network 640 starts at network device 605 and ends at network device 610. Therefore, network device 630 is a transit network device in MPLS network 640. In some embodiments, a transit network device in an MPLS network is configured to forward data through the MPLS network based on MPLS labels included in the data. A transit network device can also be referred to as a label switch router (LSR). In this example, network device 100 and forwarding processor 200 are used to implement network device 630.

The example operation begins by OS 170 of network device 630 executing a set of routing protocols one or more routing protocols (e.g., border gateway protocol (BGP), open shortest path first (OSPF), intermediate system to intermediate system (IS-IS), etc.) to discover network topology 600. Upon receiving information associated with network topology 600 from the execution of the set of routing protocols, OS 170 of network device 630 generates a set of data structures that facilitate the routing and forwarding of data through network device 630. One data structure in the set of data structures is a LFIB.

For this example, the port on network device 630 communicatively coupled to network device 605 is a first port (Eth 1), the port on network device 630 communicatively coupled to network device 620 is a second port (Eth 2), and the port on network device 630 communicatively coupled to network device 635 is a third port (Eth 3). Therefore, the LFIB in this example includes a first entry for forwarding data through the first MPLS route that specifies a mapping between data received having an MPLS label L1 and a set of egress ports Eth 2 or Eth 3 and a SWAP label L1 operation. The first entry in the LFIB can be conceptually illustrated by the following:

Label L1→Eth 2 or Eth 3; SWAP L1 where SWAP L1 is an operation that replaces the MPLS label of a packet with the MPLS label L1. That is, the first entry is specifying that the MPLS label of any packets with the MPLS label L1 is to be replaced with the same MPLS label L1 and the packet is to be forwarded out of either Eth 2 or Eth 3. In addition, the LFIB includes a second entry for forwarding data through the second MPLS route that specifies a mapping between data received having an MPLS label L2 and a set of egress ports Eth 2 or Eth 3 and a SWAP label L2 operation. The second entry in the LFIB may be conceptually illustrated by the following:

Label L2→Eth 2 or Eth 3; SWAP L2 where the SWAP L2 is an operation that replaces the MPLS label of a packet with the MPLS label L2. In other words, the second entry is specifying that the MPLS label of any packets with the MPLS label L2 is to be replaced with the same MPLS label L2 and the packet is to be forwarded out of either Eth 2 or Eth 3.

During the generation of the LFIB, OS 170 determines, based on the information associated with network topology 600, that the set of possible next hops from network device 630 in the first ECMP set of the first MPLS route (i.e., network device 620 for path P1 and network device 635 for path P2) are the same as the set of possible next hops from network device 630 in the second ECMP set of the second MPLS route (i.e., network device 620 for path P3 and network device 635 for path P4). In this example, OS 170 implements the first and second MPLS routes in the hardware resources of network device 630 in a manner that uses the same set of possible next hops from network device 630.

Logical architecture 700 illustrates how OS 170 implements the first and second MPLS routes in such a manner. In particular, logical architecture 700 in FIG. 7A illustrates how OS 170 implements the first MPLS route in network topology 600 and logical architecture 700 in FIG. 7B illustrates how OS 170 implements the second MPLS route in network topology 600. As shown in FIG. 7A, logical architecture 700 includes exact match 710, ECMP 715, FEC 720, and rewrite 725. In some embodiments, exact match 710, ECMP 715, FEC 720, and rewrite 725 are software data structures generated and managed by OS 170 in order to implement the first and second MPLS routes, among other routes, in network topology 600 for network device 630. These data structures correspond to the hardware resources shown in forwarding processor 200 and, hence, serve the same or similar functions as their hardware counterparts. Specifically, exact match 710 corresponds to exact match storage 215, ECMP 715 corresponds to ECMP storage 220, FEC 720 corresponds to FEC storage 225, and rewrite 725 corresponds to rewrite storage 235.

In this example, the first entry in exact match 710 of FIG. 7A specifies a mapping between data having an MPLS label L1 and a pointer (ECMP ID 1) to the fourth entry in ECMP 715. The fourth entry in ECMP 715 encodes the first ECMP set in network topology 600. As shown, the fourth entry in ECMP 715 includes a pointer (FEC ID 1) to the sixth entry in FEC 720 and a size attribute of two. For this example, FEC 720 stores next hop entries. The pointer to FEC 720 and the size attribute are used collectively to specify the possible next hops that are included in the first ECMP set. In particular, the pointer to FEC 720 specifies the first next hop included in the first ECMP set and the size attribute specifies the total number of next hops included in the first ECMP set. As the value of the size attribute is "2" for this example, the next hops specified in the sixth and seventh entries of FEC 720 are included in the first ECMP set. As illustrated, the sixth entry of FEC 720 includes a port Eth2 and a pointer (rewrite ID 1) to the third entry in rewrite 725 and the seventh entry of FEC 720 includes a port Eth 3 and a pointer (rewrite ID 2) to the fourth entry in rewrite 725. A port in an entry of FEC 720 can be used to determine which forwarding processor (e.g., forwarding processor 115a, forwarding processor 130a, etc.) will be used to modify and forward a packet. The forwarding processor that is determined can be the one that includes the specified port. A pointer in an entry of FEC 720 specifies an entry in the rewrite storage of the determined forwarding processor.

For this example, network device 620 has a MAC address of MAC 1 and network device 635 has a MAC address of MAC 2. The third entry in rewrite 725 stores a MAC rewrite operation for rewriting the destination MAC address of a packet with the MAC address of network device 620. The fourth entry in rewrite 725 stores a MAC rewrite operation for rewriting the destination MAC address of a packet with the MAC address of network device 635.

As explained above, logical architecture 700 in FIG. 7B shows how OS 170 implements the second MPLS route in network topology 600. For this example, the fourth entry in exact match 710 of FIG. 7B specifies a mapping between data having an MPLS label L2 and a pointer (ECMP ID 2) to the fourth entry in ECMP 715. As illustrated in FIG. 7B, the pointer of the fourth entry in exact match 710 points to the same entry (the fourth entry) in ECMP 715 as the pointer in the first entry of exact match 710 shown in FIG. 7A. The fourth entry in ECMP 715 is also used to encode the second ECMP set in network topology 600 since the set of possible next hops in the second ECMP set are the same as the set of possible next hops in the first ECMP set.

As described above, the two entries in the LFIB of network device 630 each specifies an MPLS label swap operation. However, since these MPLS label swap operations are specifying that the MPLS label of a packet be replaced with the same MPLS label, OS 170 determines to omit the MPLS label swap operations from the implementation of the first and second MPLS routes in network topology 600. In this manner, different entries in the LFIB, such as the first and second entries described above, with the same set of possible next hops can be programmed to share the same set of possible next hops. This allows network device 630 to prevent unnecessary duplicate sets of possible next hops from being programmed into the hardware resources of network device 630 and also optimize the usage of hardware resources in network device 630.

Logical architecture 700 is programmed into the corresponding hardware resources illustrated in FIG. 2 of network device 630 in order to implement network topology 600 in network device 630. In this example, logical architecture 700 is programmed into the forwarding processor 200 that includes port Eth 1, the forwarding processor 200 that includes port Eth 2, and the forwarding processor 200 that includes port Eth 3. Specifically, for the forwarding processor 200 that includes port Eth 1, exact match 710 is programmed into exact match storage 215, ECMP 715 is programmed into ECMP storage 220, and FEC 720 is programmed into FEC storage 225. For the forwarding processor 200 that includes Eth 2, the third entry in rewrite 725 is programmed into rewrite storage 235. For the forwarding processor 200 that includes Eth 3, the fourth entry in rewrite 725 is programmed into rewrite storage 235.

Once network device 630 is programmed, the forwarding processor 200 programmed with logical architecture 700 can receive from network device 605 a first packet containing MPLS label L1. Upon receiving the first packet, ingress pipeline 205 performs a lookup on exact match storage 215 using the MPLS label of the first packet. The identified entry in exact match storage 215 includes a pointer to an entry in ECMP storage 220, which encodes the two possible next hops for the first ECMP set in network topology 600. Next, ingress pipeline 205 generates a hash value based on a 5-tuple (e.g., the source IP, the destination IP, the source port, the destination port and protocol) of data specified in the first packet. Then ingress pipeline 205 selects, based on the hash value, one of the two possible next hops encoded by the entry in ECMP storage 220 by selecting one of the two entries in FEC storage 225 encoded by the entry in ECMP storage 220. Next, ingress pipeline 205 determines the forwarding processor (e.g., forwarding processor 115a, forwarding processor 130a, etc.) that includes the port specified in the selected entry in FEC storage 225. If the determined forwarding processor is different than the forwarding processor that includes port Eth 1, ingress pipeline 205 sends the first packet to the determined forwarding processor via communication bus 105. The egress pipeline 230 of the determined forwarding processor then performs a packet rewrite operation on the first packet based on a set of packet rewrite operations specified in the entry referenced in rewrite storage 235 by the pointer included in the selected entry of FEC storage 225 in order to rewrite the destination MAC address of the first packet with the MAC address of the network device at the next hop (e.g., the MAC address of network device 620 or the MAC address of network device 635). Finally, the egress pipeline 230 of the determined forwarding processor forwards the first packet out of the specified port (e.g., Eth 2 or Eth 3) of network device 630 specified in the referenced entry in rewrite storage 235.

The forwarding processor 200 programmed with logical architecture 700 may also receive from network device 605 a second packet containing MPLS label L2. In response to receiving the second packet, ingress pipeline 205 performs a lookup on exact match storage 215 using the MPLS label of the second packet. The identified entry in exact match storage 215 contains a pointer to the same entry in ECMP storage 220 used to process the first packet explained above. This entry in ECMP storage 220 is also used to encode the two possible next hops for the second ECMP set in network topology 600. Ingress pipeline 205 generates a hash value based on a 5-tuple (e.g., the source IP, the destination IP, the source port, the destination port and protocol) of data specified in the second packet. Based on the hash value, ingress pipeline 205 selects one of the two possible next hops encoded by the entry in ECMP storage 220 by selecting one of the two entries in FEC storage 225 encoded by the entry in ECMP storage 220. Ingress pipeline 205 then determines the forwarding processor (e.g., forwarding processor 115a, forwarding processor 130a, etc.) that includes the port specified in the selected entry in FEC storage 225. If the determined forwarding processor is different than the forwarding processor that includes port Eth 1, ingress pipeline 205 sends the first packet to the determined forwarding processor via communication bus 105. Next, the egress pipeline 230 of the determined forwarding processor performs a packet rewrite operation on the second packet based on a set of packet rewrite operations specified in the entry referenced in rewrite storage 235 by the pointer included in the selected entry of FEC storage 225 in order to rewrite the destination MAC address of the second packet with the MAC address of the network device at the next hop (e.g., the MAC address of network device 620 or the MAC address of network device 635). The egress pipeline 230 of the determined forwarding processor then forwards the second packet out of the specified port (e.g., Eth 2 or Eth 3) of network device 630 specified in the referenced entry in rewrite storage 235.

3.3 Example Process for Programming Hardware Resources

Figure 8:
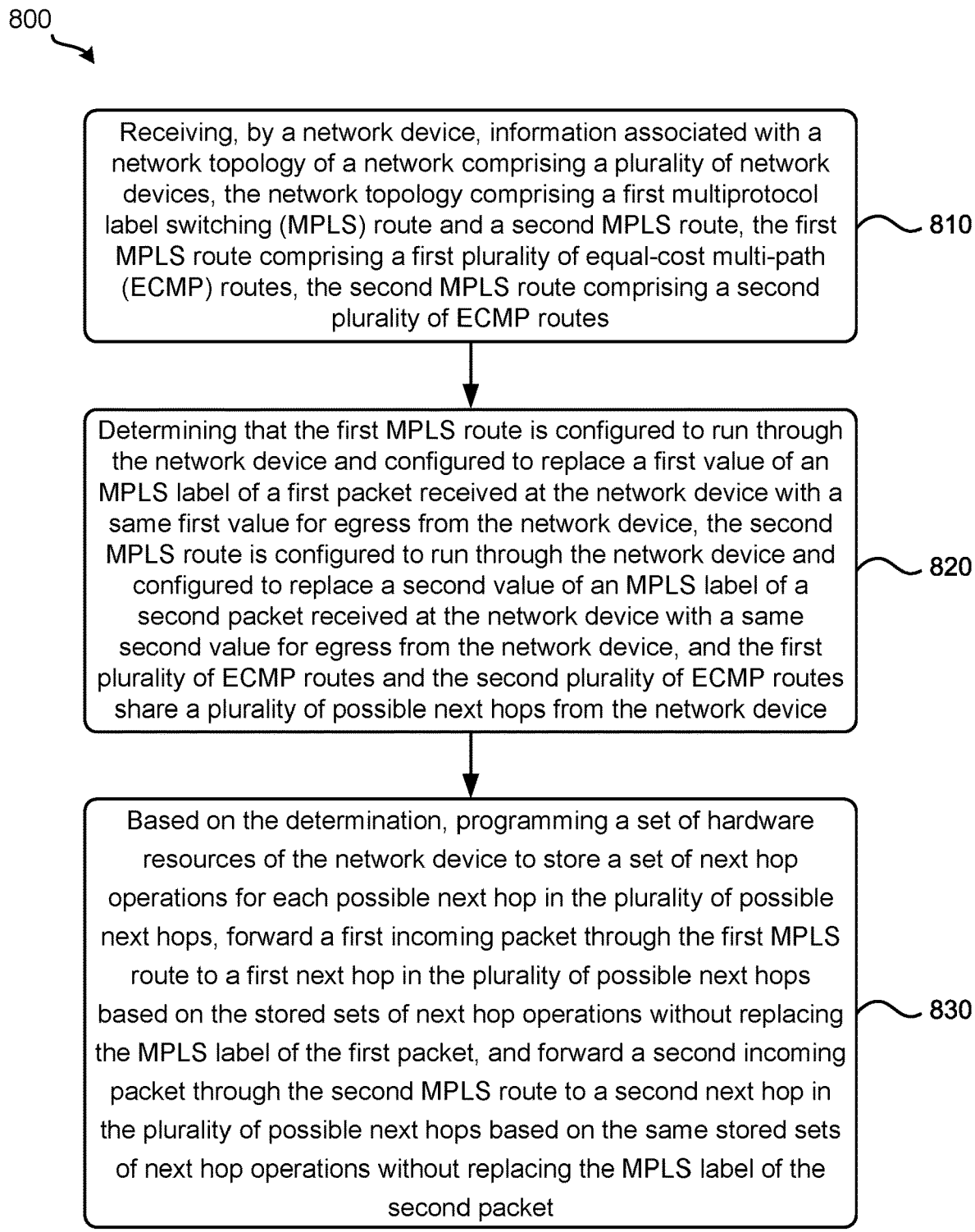
FIG. 8 illustrates a process for programming hardware of a network device according to some embodiments.

FIG. 8 illustrates a process 800 for programming hardware of a network device according to some embodiments. In some embodiments, a network device (e.g., network device 630) may perform process 800. Process 800 starts by a network device receiving, at 810, information associated with a network topology of a network comprising a plurality of network devices. The network topology comprises a first multiprotocol label switching (MPLS) route and a second MPLS route. The first MPLS route comprises a first plurality of equal-cost multi-path (ECMP) routes and the second MPLS route comprises a second plurality of ECMP routes. Referring to FIG. 6 as an example, network device 630 may receive information associated with network topology 600. As mentioned above, network topology 600 includes two MPLS tunnels. The first MPLS tunnel includes a first ECMP set that starts from network device 630 and ends at network device 615 and has two possible paths (P1 and P2). The second MPLS tunnel includes a second ECMP set that starts from network device 630 and ends at network device 625 and has two possible paths (P3 and P4).

Next, process 800 determines, at 820, that the first MPLS route is configured to run through the network device and configured to replace a first value of an MPLS label of a first packet received at the network device with a same first value for egress from the network device, the second MPLS route is configured to run through the network device and configured to replace a second value of an MPLS label of a second packet received at the network device with a same second value for egress from the network device, and the first plurality of ECMP routes and the second plurality of ECMP routes share a plurality of possible next hops from the network device. Referring to the FIG. 6 as an example, network device 630 determines that the first MPLS route is configured to run through network device 630 and configured to replace an MPLS label L1 of a first packet received at network device 630 with the same MPLS label L1 for egress from network device 630. Network device 630 also determines that the second MPLS route is configured to run through network device 630 and configured to replace an MPLS label L2 of a second packet received at network device 630 with the same MPLS label L2 for egress from network device 630. In addition, network device 630 determines that the first ECMP set and the second ECMP set share the same set of possible next hops from network device 630.

Based on the determination, process 800 programs, at 830, a set of hardware resources of the network device to store a set of next hop operations for each possible next hop in the plurality of possible next hops, forward a first incoming packet through the first MPLS route to a first next hop in the plurality of possible next hops based on the stored sets of next hop operations without replacing the MPLS label of the first packet, and forward a second incoming packet through the second MPLS route to a second next hop in the plurality of possible next hops based on the same stored sets of next hop operations without replacing the MPLS label of the second packet. Referring to FIGS. 6, 7A, and 7B as an example, network device 630 programs hardware resources in a forwarding processor of network device 630 with the logical architecture 700 illustrated in FIGS. 7A and 7B in order to implement network topology 600 in network device 630. After network device 630 is programmed, network device 630 may forward packets received from network device 605 having an MPLS label L1 using the same set of possible next hops stored in the hardware resources of network device 630 as those used to forward packets received from network device 605 having an MPLS label L2. In addition, network device 630 forwards such packets without performing MPLS label swap operations even if such operations are specified in network topology 600.

FIGS. 6-8 illustrate examples and embodiments directed at MPLS routes. One of ordinary skill in the art will understand that programming hardware resources of a network device to share a common set of possible next hops may be applicable to additional and/or different types of routes. For example, a common set of possible next hops may be programmed to be shared between MPLS routes, IP routes, etc., that include ECMP sets having the same common set of possible next hops.

4. MPLS Label Pop Optimization

The next section will describe another example of optimizing the programming of MPLS label-switched paths (LSPs) into the hardware resources of a network device (e.g., network device 100). This section starts by describing an example network topology, followed by example logical architectures for implementing the network topology into the hardware resources of the network device, and ends with a process for programming the hardware resources of a network device.

4.1 Example Network Topology

Figure 9:
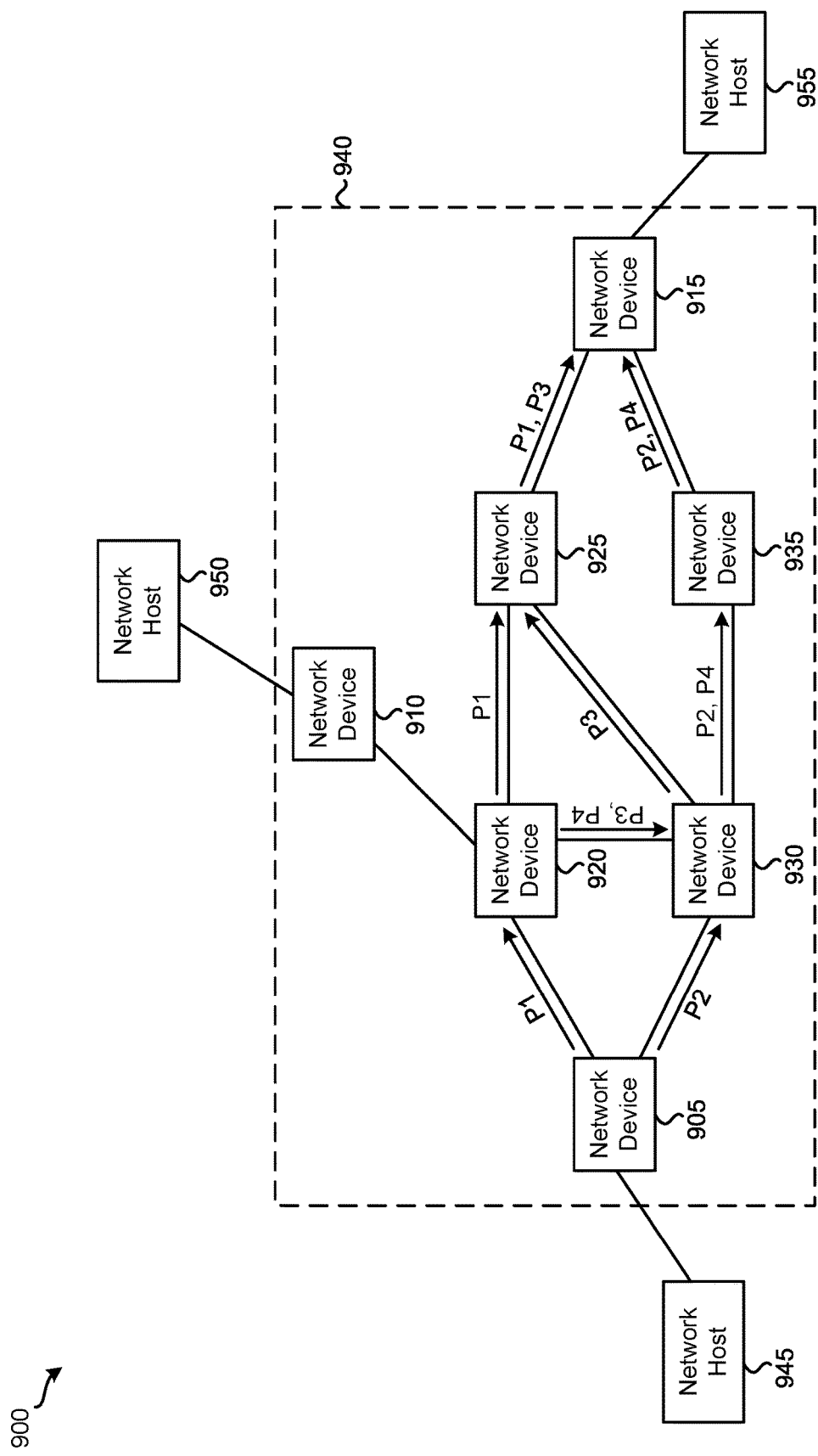
FIG. 9 illustrates an example network topology according to some embodiments.

FIG. 9 illustrates an example network topology 900 according to some embodiments. As shown in FIG. 9, network topology 900 includes network 940 and network hosts 945-955. Network hosts 945-955 are communicatively coupled to one another via network 940. Each of the network hosts 945-955 may be a computing device (e.g., a desktop computer, a laptop, a smartphone, a tablet, a server, etc.) a configured to send data to and receive data from each other via network 940. Network 940 is an MPLS network in this example. As illustrated, network 940 includes network devices 905-935. Network devices 905-935 may each be a network switch and/or a network router configured to process and forward data through network 940. For example, each of the network devices 905-935 can be implemented by network device 100.

As shown in FIG. 9, network 940 includes two ECMP sets. A first ECMP set starts from network device 905 and ends at network device 915 and has two possible paths. A second ECMP set starts from network device 920 and ends at network device 915 and has two possible paths. The first ECMP set includes a first path (P1) that starts from network device 905, traverses through network devices 920 and 925, and ends at network device 915. A second path (P2) in the first ECMP set starts from network device 905, traverses through network devices 930 and 935, and ends at network device 915. In the second ECMP set, a first path (P3) starts from network device 920, traverses through network devices 930 and 925, and ends at network device 915. A second path (P4) in the second ECMP set starts from network device 920, traverses through network devices 930 and 935, and ends at network device 915.

In addition, network topology 900 also includes two MPLS routes (not shown) in this example. A first MPLS route starts at network device 905 and ends at network device 915 and is assigned an MPLS label L1. The first MPLS route is for transporting packets originating from network host 945 and destined for network host 955. The first MPLS route also includes the first ECMP set. As such, two different paths, each having the same cost, from network device 905 to network device 915 may be used to transmit data through the first MPLS route. A second MPLS route starts at network device 910 and ends at network device 915 and is assigned an MPLS label L2. The second MPLS route is for transporting packets originating from network host 950 and destined for network host 955. Also, the second MPL route includes the second ECMP set. Therefore, two different paths, each having the same cost, from network device 920 to network device 915 can be used to transmit data through the second MPLS route.

4.2 Example Logical Architecture

Figure 10A:
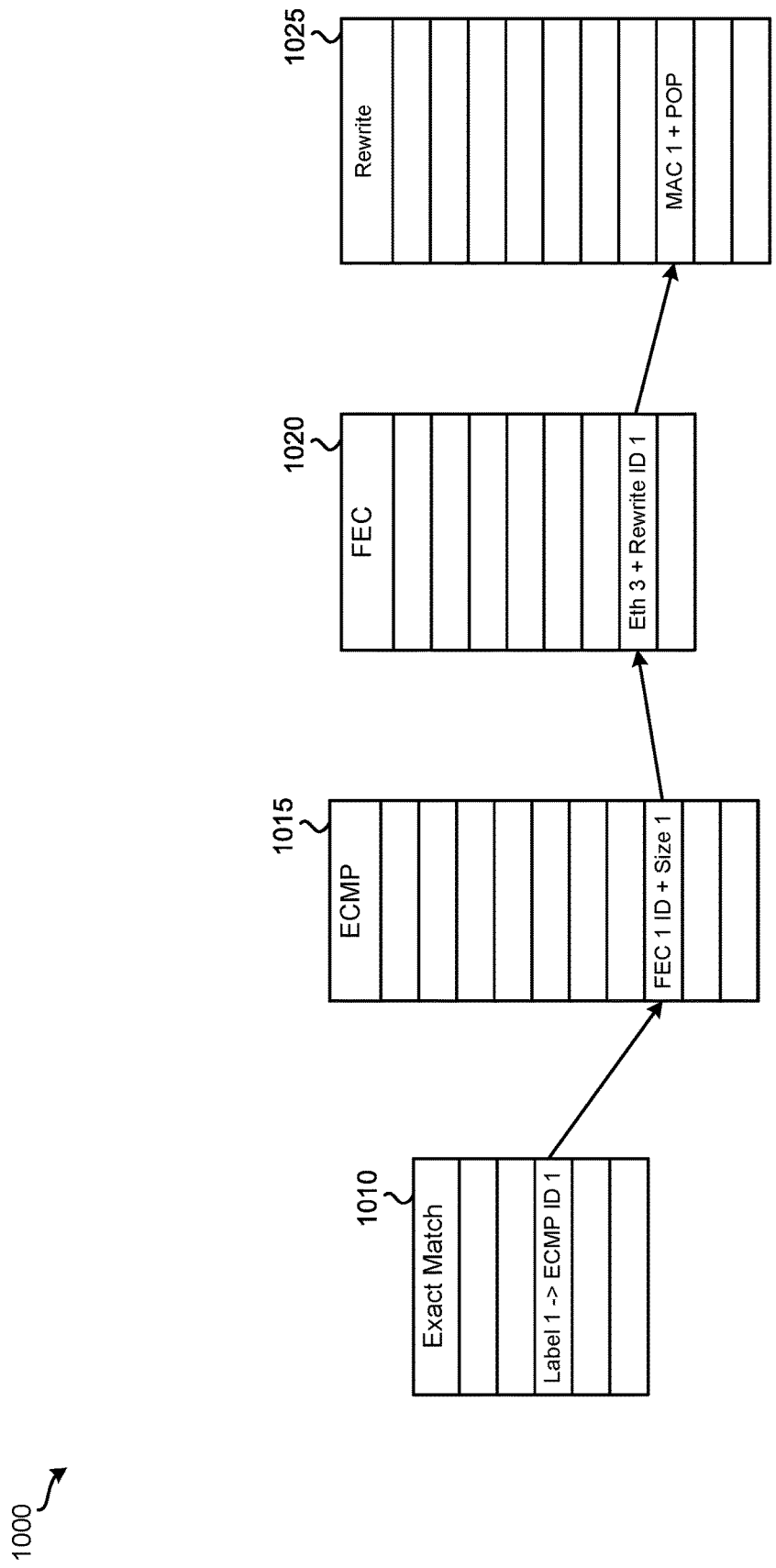
FIGS. 10A and 10B illustrate a logical architecture for implementing the network topology illustrated in FIG. 9 in a network device according to some embodiments.
Figure 10B:
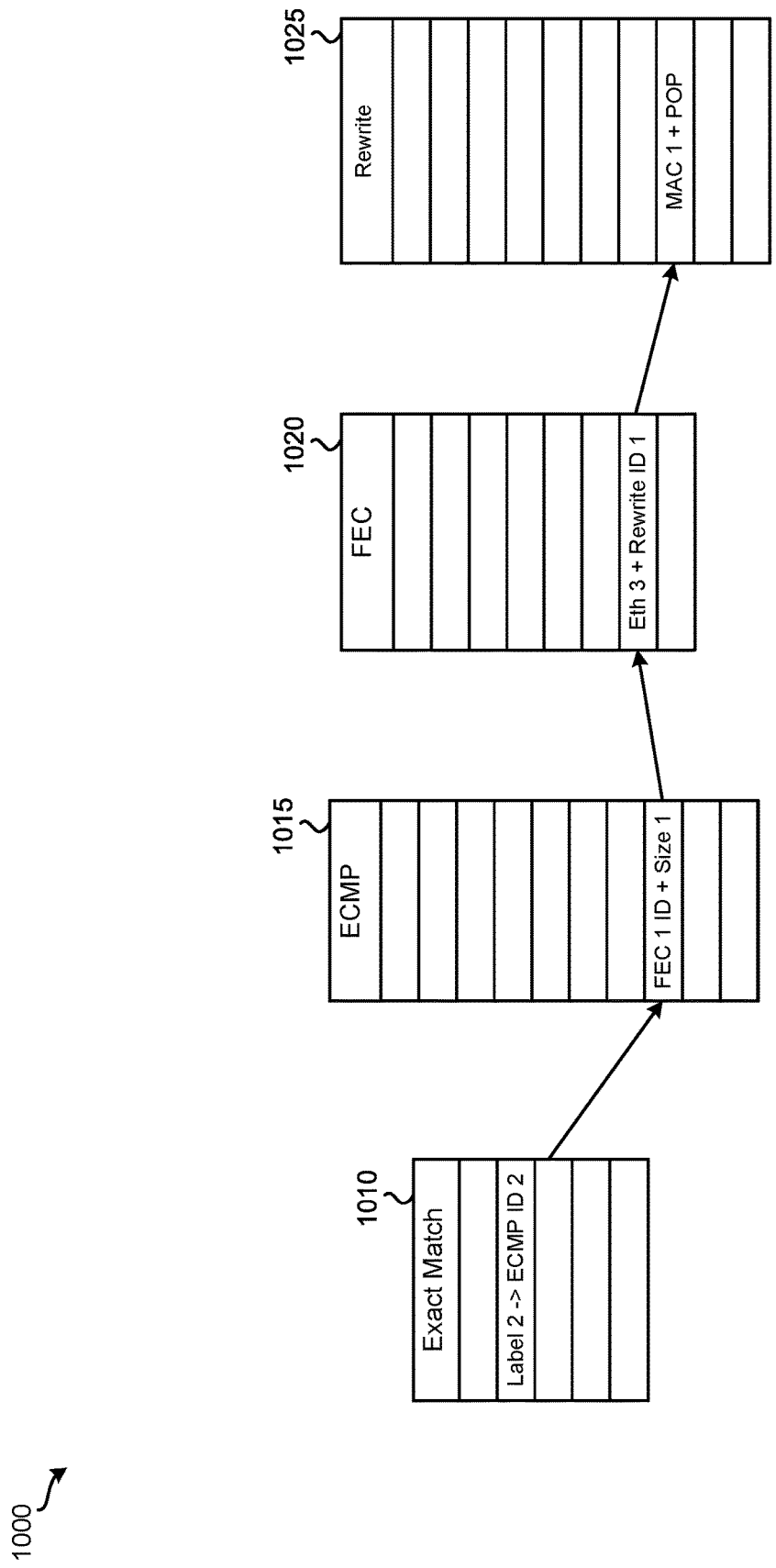

FIGS. 10A and 10B illustrate a logical architecture 1000 for implementing the network topology 900 in a network device according to some embodiments. In particular, logical architecture 1000 is used to implement network topology 900 in network device 915. As described above by reference to FIG. 9, the first and second MPLS routes in MPLS network 940 end at network device 915. Hence, network device 915 is an egress network device of the first and second MPLS routes. As illustrated in FIG. 9, network device 915 is operating at the edge of MPLS network 940 and acts as the entry and exit points of MPLS network 940. As an edge network device of MPLS network 940, network device 915 can be configured to encapsulate data (e.g., IP data) with MPLS labels for transmission through MPLS network 940 and decapsulate data exiting MPLS network 940 (e.g., by stripping MPLS labels from the encapsulated data). For this example, network device 100 and forwarding processor 200 are used to implement network device 915.

The example operation starts by OS 170 of network device 915 executing a set of routing protocols one or more routing protocols (e.g., border gateway protocol (BGP), open shortest path first (OSPF), intermediate system to intermediate system (IS-IS), etc.) to discover network topology 900. Once OS 170 receives information associated with network topology 900 from the execution of the set of routing protocols, OS 170 of network device 915 generates a set of data structures that facilitate the routing and forwarding of data through network device 915. One data structure in the set of data structures is a LFIB.

In this example, the port on network device 915 communicatively coupled to network device 925 is a first port (Eth 1), the port on network device 915 communicatively coupled to network device 935 is a second port (Eth 2), and the port on network device 915 communicatively coupled to network host 955 is a third port (Eth 3). Therefore, for this example, the LFIB includes a first entry for forwarding data from the end of the first MPLS route to network host 955 that specifies a mapping between data received having an MPLS label L1 and an egress port Eth 3 and a POP label operation. The first entry in the LFIB may be conceptually illustrated by the following:

Label L1→Eth 3; POP where POP is an operation that decapsulates (e.g., removes) an MPLS label from a packet. That is, the first entry is specifying that the MPLS label L1 of any packets received is to be removed from the packet that the packet is to be forwarded out of Eth 3. The LFIB also includes a second entry for forwarding data from the end of the second MPLS route to network host 955 that specifies a mapping between data received having an MPLS label L2 and an egress port Eth 3 and a POP label operation. The second entry in the LFIB can be conceptually illustrated by the following:

Label L2→Eth 3; POP where the POP is an operation that decapsulates (e.g., removes) an MPLS label from a packet. In other words, the second entry is specifying that the MPLS label L2 of any packets received is to be removed from the packet and that the packet is to be forwarded out of Eth 3.

When OS 170 is generating the LFIB, OS 170 determines, based on the information associated with network topology 900, that network device 915 is the egress of the first and second MPLS routes, that each path in the first ECMP set terminates at the end of the first MPLS route, and that each path in the second ECMP set terminates at the end of the second MPLS route. In other words, OS 170 determines that network device 915 is responsible for decapsulating MPLS data received at the end of the first MPLS route via any of the paths in the first ECMP set and decapsulating MPLS data received at the end of the second MPLS route via any of the paths in the second ECMP set. In addition, OS 170 determines, based on the information associated with network topology 900, that next hop after the end of the first MPLS route (i.e., network host 955) is the same as the next hop after the end of the second MPLS route (i.e., network host 955). For this example, OS 170 implements the first and second MPLS routes in the hardware resources of network device 915 in a manner that uses the same next hop from network device 915.

Logical architecture 1000 shows how OS 170 implements the first and second MPLS routes in such a manner. Specifically, logical architecture 1000 in FIG. 10A illustrates how OS 170 implements the first MPLS route in network topology 900 and logical architecture 1000 in FIG. 10B illustrates how OS 170 implements the second MPLS route in network topology 900. As illustrated in FIG. 10A, logical architecture 1000 includes exact match 1010, ECMP 1015, FEC 1020, and rewrite 1025. In some embodiments, exact match 1010, ECMP 1015, FEC 1020, and rewrite 1025 are software data structures generated and managed by OS 170 in order to implement the first and second MPLS routes, among other routes, in network topology 900 for network device 915. These data structures correspond to the hardware resources illustrated in forwarding processor 200 and, thus, serve the same or similar functions as their hardware counterparts. In particular, exact match 1010 corresponds to exact match storage 215, ECMP 1015 corresponds to ECMP storage 220, FEC 1020 corresponds to FEC storage 225, and rewrite 1025 corresponds to rewrite storage 235.

For this example, the third entry in exact match 1010 of FIG. 10A specifies a mapping between data received having an MPLS label L1 and a pointer (ECMP ID 1) to the eighth entry in ECMP 1015. The eighth entry in ECMP 1015 encodes the next hop from network device 915 at the end of the first MPLS route and the label pop operation for the first MPLS route in network topology 900. As illustrated, the eighth entry in ECMP 1015 includes a pointer (FEC ID 1) to the seventh entry in FEC 1020 and a size attribute of one. In this example, FEC 1020 stores next hop entries. The pointer to FEC 1020 and the size attribute are used collectively to specify the next hop. Specifically, the pointer to FEC 1020 specifies the next hop, which includes a port Eth 3 and a pointer (rewrite ID 1) to the eighth entry in rewrite 1025. A port in an entry of FEC 1020 may be used to determine which forwarding processor (e.g., forwarding processor 115a, forwarding processor 130a, etc.) will be used to modify and forward a packet. The forwarding processor that is determined can be the one that includes the specified port. A pointer in an entry of FEC 1020 specifies an entry in the rewrite storage of the determined forwarding processor. In this example, network host 955 has a MAC address of MAC 1. As shown, the eighth entry in rewrite 1025 stores a MAC rewrite operation for rewriting the destination MAC address of a packet with the MAC address of network host 955 and a POP label operation for decapsulating an MPLS label.

As mentioned above, logical architecture 1000 in FIG. 10B shows how OS 170 implements the second MPLS route in network topology 900. In this example, the second entry in exact match 1010 of FIG. 10B specifies a mapping between data received having an MPLS label L2 and a pointer (ECMP ID 2) to the eighth entry in ECMP 1015. As shown in FIG. 10B, the pointer of the second entry in exact match 1010 points to the same entry (the eighth entry) in ECMP 1015 as the pointer in the first entry of exact match 1010 illustrated in FIG. 10A. The eighth entry in ECMP 1015 is also used to encode the next hop from network device 915 at the end of the second MPLS route and the label pop operation for the second MPLS route in network topology 900 because the next hop at the end of the second MPLS route is the same as the next hop at the end of the first MPLS route.

As explained above, the two entries in the LFIB of network device 915 each specifies an MPLS label pop operation. Because the entries have the same next hop and they both specify an MPLS label pop operation, OS 170 is able to program these different entries in the LFIB to share the same next hop and the same MPLS label pop operations. In this fashion, network device 915 can prevent unnecessary duplicate sets of next hop from being programmed into the hardware resources of network device 915 and additionally optimize the usage of hardware resources in network device 915.

Logical architecture 1000 is programmed into the corresponding hardware resources illustrated in FIG. 2 of network device 915 in order to implement network topology 900 in network device 915. In this example, logical architecture 1000 is programmed into the forwarding processor 200 that includes port Eth 1, the forwarding processor 200 that includes port Eth 2, and the forwarding processor 200 that includes port Eth 3. In particular, for the forwarding processor 200 that includes port Eth 1, exact match 1010 is programmed into exact match storage 215, ECMP 1015 is programmed into ECMP storage 220, and FEC 1020 is programmed into FEC storage 225. For the forwarding processor 200 that includes Eth 2, exact match 1010 is programmed into exact match storage 215, ECMP 1015 is programmed into ECMP storage 220, and FEC 1020 is programmed into FEC storage 225. For the forwarding processor 200 that includes Eth 3, the eighth entry in rewrite 1025 is programmed into rewrite storage 235.

After network device 915 is programmed, the forwarding processor 200 that includes port Eth 1 can receive from network device 925 a first packet containing MPLS label L1. In response to receiving the first packet, ingress pipeline 205 performs a lookup on exact match storage 215 using the MPLS label of the first packet. The identified entry in exact match storage 215 includes a pointer to an entry in ECMP storage 220, which encodes the next hop and the label pop operation for the first MPLS route in network topology 900. The entry in ECMP 220 includes a pointer to an entry in FEC 225. Next, ingress pipeline 205 determines the forwarding processor (e.g., forwarding processor 115a, forwarding processor 130a, etc.) that includes port Eth 3, which is specified in the entry in FEC storage 225. If the determined forwarding processor is different than the forwarding processor that includes port Eth 1, ingress pipeline 205 sends the first packet to the determined forwarding processor via communication bus 105. The egress pipeline 230 of the determined forwarding processor performs a packet rewrite operation on the first packet based on a set of packet rewrite operations specified in the entry referenced in rewrite storage 235 by the pointer included in the entry of FEC storage 225 in order to rewrite the destination MAC address of the first packet with the MAC address of network host 955, the next hop from network device 915. The egress pipeline 230 of the determined forwarding processor then decapsulates the MPLS label from the first packet. Finally, the egress pipeline 230 of the determined forwarding processor forwards the first packet out of the port Eth 3 of network device 915. The forwarding processor 200 that includes port Eth 2 and, thus, programmed with logical architecture 1000, can receive from network device 935 a second packet containing MPLS label L1. This forwarding processor 200 processes the second packet in the same or similar manner as the forwarding processor 200 that processed of the first packet.

The forwarding processor 200 that includes port Eth 1 may also receive from network device 925 a third packet containing MPLS label L2. Once ingress pipeline 205 receives the third packet, ingress pipeline 205 performs a lookup on exact match storage 215 using the MPLS label of the third packet. The identified entry in exact match storage 215 contains a pointer to the same entry in ECMP storage 220 used to process the first packet explained above. This entry in ECMP storage 220 is also used to encode the next hop and the label pop operation for the second MPLS route in network topology 900. Ingress pipeline 205 then determines the forwarding processor (e.g., forwarding processor 115a, forwarding processor 130a, etc.) that includes port Eth 3, which is specified in the entry in FEC storage 225. If the determined forwarding processor is different than the forwarding processor that includes port Eth 1, ingress pipeline 205 sends the first packet to the determined forwarding processor via communication bus 105. Since the encoded next hop and label pop operation for the second MPLS route are the same as the ones for the first MPLS route, the egress pipeline 230 of the determined forwarding processor performs the same MAC rewrite operation, decapsulation of the MPLS label, and forwarding to the third packet. That is, the egress pipeline 230 of the determined forwarding processor rewrites the destination MAC address of the third packet with the MAC address of network host 955, decapsulates the MPLS label from the third packet, and forwards the third packet out of the port Eth 3 of network device 915. The forwarding processor 200 that includes port Eth 2 and, thus, programmed with logical architecture 1000, can receive from network device 935 a fourth packet containing MPLS label L2. This forwarding processor 200 processes the fourth packet in the same or similar manner as the forwarding processor 200 that processed of the third packet.

4.3 Example Process for Programming Hardware Resources

Figure 11:
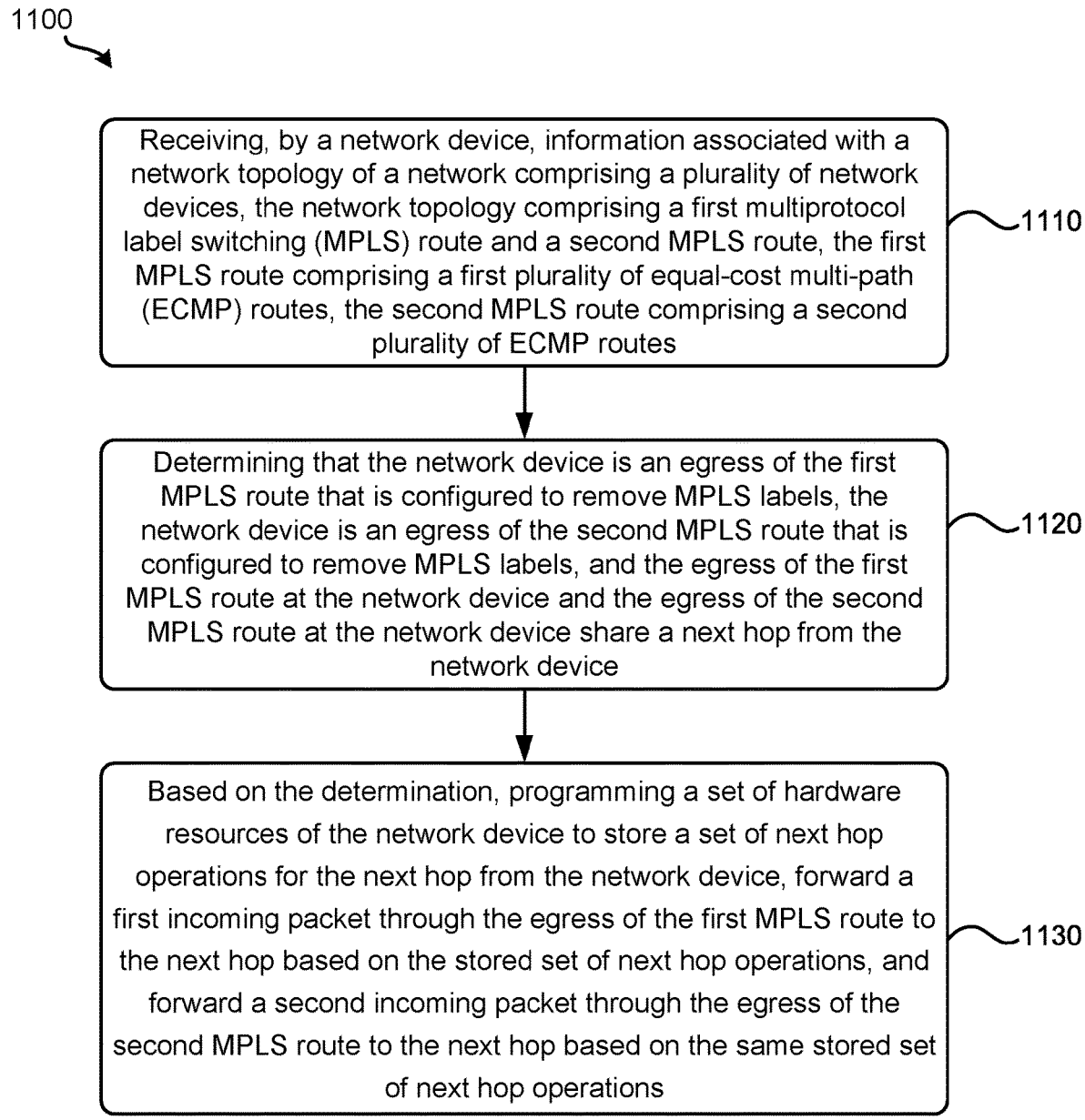
FIG. 11 illustrates a process for programming hardware of a network device according to some embodiments.

FIG. 11 illustrates a process 1100 for programming hardware of a network device according to some embodiments. In some embodiments, a network device (e.g., network device 915) can perform process 1100. Process 1100 begins by a network device receiving, at 1110, information associated with a network topology of a network comprising a plurality of network devices. The network topology comprises a first multiprotocol label switching (MPLS) route and a second MPLS route. The first MPLS route comprises a first plurality of equal-cost multi-path (ECMP) routes and the second MPLS route comprises a second plurality of ECMP routes. Referring to FIG. 9 as an example, network device 915 may receive information associated with network topology 900. As explained above, network topology 900 includes two MPLS tunnels. The first MPLS tunnel includes a first ECMP set that starts from network device 905 and ends at network device 915 and has two possible paths (P1 and P2). The second MPLS tunnel includes a second ECMP set that starts from network device 920 and ends at network device 915 and has two possible paths (P3 and P4). Both the first and second MPLS tunnels end at network device 915.

Next, process 1100 determines, at 1120, that the network device is an egress of the first MPLS route that is configured to remove MPLS labels, the network device is an egress of the second MPLS route that is configured to remove MPLS labels, and the egress of the first MPLS route at the network device and the egress of the second MPLS route at the network device share a next hop from the network device. Referring to the FIG. 9 as an example, network device 915 determines that it is an egress of the first and second MPLS routes and that it is responsible for decapsulating MPLS data received at the end of the first MPLS route via any of the paths in the first ECMP set and decapsulating MPLS data received at the end of the second MPLS route via any of the paths in the second ECMP set. In addition, network device 915 also determines that next hop after the end of the first MPLS route is the same as the next hop after the end of the second MPLS route (i.e., network host 955).

Based on the determination, process 1100 programs, at 1130, a set of hardware resources of the network device to store a set of next hop operations for the next hop from the network device, forward a first incoming packet through the egress of the first MPLS route to the next hop based on the stored set of next hop operations, and forward a second incoming packet through the egress of the second MPLS route to the next hop based on the same stored set of next hop operations. Referring to FIGS. 9, 10A, and 10B as an example, network device 915 programs hardware resources in the forwarding processor of network device 915 that includes Eth port 1 with the logical architecture 1000 illustrated in FIGS. 10A and 10B and also programs hardware resources in the forwarding processor of network device 915 that includes Eth port 2 with the logical architecture 1000 illustrated in FIGS. 10A and 10B. This way, network device 915 can implement network topology 900 in network device 915. Once network device 915 is programmed, network device 915 may forward packets received from network device 925 having an MPLS label L1, packets received from network device 925 having an MPLS label L2, packets received from network device 935 having an MPLS label L1, and packets received from network device 935 having an MPLS label L2 using the same next hop and MPLS pop label operation stored in the hardware resources of network device 915

FIGS. 9-11 illustrate examples and embodiments directed at MPLS routes. One of ordinary skill in the art will appreciate that programming hardware resources of a network device to share a common set of possible next hops may be applicable to additional and/or different types of routes. For instance, a common set of possible next hops may be programmed to be shared between MPLS routes, IP routes, etc., that include ECMP sets having the same common set of possible next hops.

5. Further Examples

In some embodiments, a method receives, by a network device, information associated with a network topology of a network comprising a plurality of network devices. The network topology includes a first tunnel and a second tunnel. The first tunnel includes a first plurality of multipath routes. The second tunnel includes a second plurality of multipath routes. The method further determines that the first tunnel is configured to run through the network device and configured to replace a first value of encapsulation data of a first packet received at the network device with a same first value for egress from the network device, the second tunnel is configured to run through the network device and configured to replace a second value of encapsulation data of a second packet received at the network device with a same second value for egress from the network device, and the first plurality of multipath routes and the second plurality of multipath routes share a plurality of possible next hops from the network device. Based on the determination, the method also programs a set of hardware resources of the network device to store a set of next hop operations for each possible next hop in the plurality of possible next hops, forward a first incoming packet through the first tunnel to a first next hop in the plurality of possible next hops based on the stored sets of next hop operations without replacing the encapsulation data of the first packet, and forward a second incoming packet through the second tunnel to a second next hop in the plurality of possible next hops based on the same stored sets of next hop operations without replacing the encapsulation data of the second packet.

In some embodiments, the network topology may further include an Internet Protocol route that includes a third plurality of multipath routes. The method may further determine that the third plurality of multipath routes share the plurality of possible next hops from the network device and program the set of hardware resources of the network device to forward a third incoming packet through the IP route to a third next hop in the plurality of possible next hops based on the same stored sets of next hop operations.

In some embodiments, the set of next hop operations stored for each possible next hop in the plurality of possible next hops may include a packet rewrite operation configured to rewrite a destination address of a particular packet to be an address of a network device at the corresponding the possible next hop.

In some embodiments, the set of hardware resources of the network device may include a first hardware resource configured to store the first and second tunnels in the network topology and pointers to a second hardware resource. The second hardware resource may be configured to encode the first plurality of multipath routes and the second plurality of multipath routes.

In some embodiments, the network may be a first network. The network device may be included in the first network and a second network. The network device may be a transit network device in the second network that is configured to forward data through the second network based on labels.

In some embodiments, the network may be a first network. The network device may be included in the first network and a second network and is configured to operate in the middle of the second network.

In some embodiments, the method may further generate a logical architecture comprising a set of data structures for implementing the first and second tunnels in the network topology in the network device. The set of data structures may correspond to the set of hardware resources of the network device.

In some embodiments, a network device includes a processor and a non-transitory machine-readable medium that stores instructions. The instructions cause the processor to receive information associated with a network topology of a network that includes a plurality of network devices. The network topology includes a first tunnel and a second tunnel. The first tunnel includes a first plurality of multipath routes. The second tunnel includes a second plurality of multipath routes. The instructions further cause the processor to determine that the first tunnel is configured to run through the network device and configured to replace a first value of encapsulation data of a first packet received at the network device with a same first value for egress from the network device, the second tunnel is configured to run through the network device and configured to replace a second value of encapsulation data of a second packet received at the network device with a same second value for egress from the network device, and the first plurality of multipath routes and the second plurality of multipath routes share a plurality of possible next hops from the network device. Based on the determination, the instructions also cause the processor to program a set of hardware resources of the network device to store a set of next hop operations for each possible next hop in the plurality of possible next hops, forward a first incoming packet through the first tunnel to a first next hop in the plurality of possible next hops based on the stored sets of next hop operations without replacing the encapsulation data of the first packet, and forward a second incoming packet through the second tunnel to a second next hop in the plurality of possible next hops based on the same stored sets of next hop operations without replacing the encapsulation data of the second packet.

In some embodiments, the network topology may further include an Internet Protocol route that includes a third plurality of multipath routes. The instructions may further cause the processor to determine that the third plurality of multipath routes share the plurality of possible next hops from the network device and program the set of hardware resources of the network device to forward a third incoming packet through the IP route to a third next hop in the plurality of possible next hops based on the same stored sets of next hop operations.

In some embodiments, the set of next hop operations stored for each possible next hop in the plurality of possible next hops may include a packet rewrite operation configured to rewrite a destination address of a particular packet to be an address of a network device at the corresponding the possible next hop.

In some embodiments, the set of hardware resources of the network device may include a first hardware resource configured to store the first and second tunnels in the network topology and pointers to a second hardware resource. The second hardware resource may be configured to encode the first plurality of multipath routes and the second plurality of multipath routes.

In some embodiments, the network may be a first network. The network device may be included in the first network and a second network. The network device may be a transit network device in the second network that is configured to forward data through the second network based on labels.

In some embodiments, the network may be a first network. The network device may be included in the first network and a second network and is configured to operate in the middle of the second network.

In some embodiments, the instructions may further cause the processor to generate a logical architecture including a set of data structures for implementing the first and second tunnels in the network topology in the network device. The set of data structures may correspond to the set of hardware resources of the network device.

In some embodiments, a non-transitory machine-readable medium stores a program executable by at least one processing unit of a network device. The program receives information associated with a network topology of a network that includes a plurality of network devices. The network topology includes a first tunnel and a second tunnel. The first tunnel includes a first plurality of multipath routes. The second tunnel includes a second plurality of multipath routes. The program further determines that the first tunnel is configured to run through the network device and configured to replace a first value of encapsulation data of a first packet received at the network device with a same first value for egress from the network device, the second tunnel is configured to run through the network device and configured to replace a second value of encapsulation data of a second packet received at the network device with a same second value for egress from the network device, and the first plurality of multipath routes and the second plurality of multipath routes share a plurality of possible next hops from the network device. Based on the determination, the program also programs a set of hardware resources of the network device to store a set of next hop operations for each possible next hop in the plurality of possible next hops, forward a first incoming packet through the first tunnel to a first next hop in the plurality of possible next hops based on the stored sets of next hop operations without replacing the encapsulation data of the first packet, and forward a second incoming packet through the second tunnel to a second next hop in the plurality of possible next hops based on the same stored sets of next hop operations without replacing the encapsulation data of the second packet.

In some embodiments, the network topology may further include an Internet Protocol route that includes a third plurality of multipath routes. The program may further determine that the third plurality of multipath routes share the plurality of possible next hops from the network device and program the set of hardware resources of the network device to forward a third incoming packet through the IP route to a third next hop in the plurality of possible next hops based on the same stored sets of next hop operations.

In some embodiments, the set of next hop operations stored for each possible next hop in the plurality of possible next hops may include a packet rewrite operation configured to rewrite a destination address of a particular packet to be an address of a network device at the corresponding the possible next hop.

In some embodiments, the set of hardware resources of the network device may include a first hardware resource configured to store the first and second tunnels in the network topology and pointers to a second hardware resource. The second hardware resource may be configured to encode the first plurality of multipath routes and the second plurality of multipath routes.

In some embodiments, the network may be a first network. The network device may be included in the first network and a second network. The network device may be a transit network device in the second network that is configured to forward data through the second network based on labels.

In some embodiments, the program may further generate a logical architecture comprising a set of data structures for implementing the first and second tunnels in the network topology in the network device. The set of data structures may correspond to the set of hardware resources of the network device.

In some embodiments, a method receives, by a network device, information associated with a network topology of a network that includes a plurality of network devices. The network topology includes a first tunnel and a second tunnel. The first tunnel includes a first plurality of multipath routes. The second tunnel includes a second plurality of multipath routes. The method further determines that the network device is an egress of the first tunnel that is configured to remove encapsulation data, the network device is an egress of the second tunnel that is configured to remove encapsulation data, and the egress of the first tunnel at the network device and the egress of the second tunnel at the network device share a next hop from the network device. Based on the determination, the method also programs a set of hardware resources of the network device to store a set of next hop operations for the next hop from the network device, forward a first incoming packet through the egress of the first tunnel to the next hop based on the stored set of next hop operations, and forward a second incoming packet through the egress of the second tunnel to the next hop based on the same stored set of next hop operations.

In some embodiments, the network topology may further include an Internet Protocol route through the network device. The method may further determine that the IP route shares the next hop from the network device; and program the set of hardware resources of the network device to forward a third incoming packet through the IP route to the next hop based on the same stored sets of next hop operations.

In some embodiments, a first encapsulation data may be associated with the first tunnel and a second encapsulation data may be associated with the second tunnel. The first packet may include the first encapsulation data and the second packet may include the second encapsulation data. The method may further program the set of hardware resources of the network device to decapsulate the first encapsulation data from the first packet before forwarding the first packet to the next hop and decapsulate the second encapsulation data from the second packet before forwarding the first packet to the next hop.

In some embodiments, the set of next hop operations stored for the next hop from the network device may include a packet rewrite operation configured to rewrite a destination address of the first packet and the second packet to be an address of a network device at the corresponding the next hop.

In some embodiments, the method may further determine that each route in the first plurality of multipath routes terminates at the end of the first tunnel and determine that each route in the second plurality of multipath routes terminates at the end of the second tunnel.

In some embodiments, the network may be a first network. The network device may be included in the first network and a second network and may be configured to operate at the edge of the second network.

In some embodiments, the method may further generate a logical architecture including a set of data structures for implementing the first and second tunnels in the network topology in the network device. The set of data structures may correspond to the set of hardware resources of the network device.

In some embodiments, a network device includes a processor and a non-transitory machine-readable medium that stores instructions. The instructions cause the processor to receive information associated with a network topology of a network that includes a plurality of network devices. The network topology includes a first tunnel and a second tunnel. The first tunnel includes a first plurality of multipath routes. The second tunnel includes a second plurality of multipath routes. The instructions further cause the processor to determine that the network device is an egress of the first tunnel that is configured to remove encapsulation data, the network device is an egress of the second tunnel that is configured to remove encapsulation data, and the egress of the first tunnel at the network device and the egress of the second tunnel at the network device share a next hop from the network device. Based on the determination, the instructions also cause the processor to program a set of hardware resources of the network device to store a set of next hop operations for the next hop from the network device, forward a first incoming packet through the egress of the first tunnel to the next hop based on the stored set of next hop operations, and forward a second incoming packet through the egress of the second tunnel to the next hop based on the same stored set of next hop operations.

In some embodiments, the network topology may further include an Internet Protocol route through the network device. The instructions may further cause the processor to determine that the IP route shares the next hop from the network device and program the set of hardware resources of the network device to forward a third incoming packet through the IP route to the next hop based on the same stored sets of next hop operations.

In some embodiments, a first encapsulation data may be associated with the first tunnel and a second encapsulation data may be associated with the second tunnel. The first packet may include the first encapsulation data and the second packet may include the second encapsulation data. The instructions may further cause the processor to program the set of hardware resources of the network device to decapsulate the first encapsulation data from the first packet before forwarding the first packet to the next hop and decapsulate the second encapsulation data from the second packet before forwarding the first packet to the next hop.

In some embodiments, the set of next hop operations stored for the next hop from the network device may include a packet rewrite operation configured to rewrite a destination address of the first packet and the second packet to be an address of a network device at the corresponding the next hop.

In some embodiments, the instructions may further cause the processor to determine that each route in the first plurality of multipath routes terminates at the end of the first tunnel and determine that each route in the second plurality of multipath routes terminates at the end of the second tunnel.

In some embodiments, the network may be a first network. The network device may be included in the first network and a second network and may be configured to operate at the edge of the second network.

In some embodiments, the instructions may further cause the processor to generate a logical architecture comprising a set of data structures for implementing the first and second tunnels in the network topology in the network device. The set of data structures may correspond to the set of hardware resources of the network device.

In some embodiments, a non-transitory machine-readable medium stores a program executable by at least one processing unit of a network device. The program receives information associated with a network topology of a network that includes a plurality of network devices. The network topology includes a first tunnel and a second tunnel. The first tunnel includes a first plurality of multipath routes. The second tunnel includes a second plurality of multipath routes. The program further determines that the network device is an egress of the first tunnel that is configured to remove encapsulation data, the network device is an egress of the second tunnel that is configured to remove encapsulation data, and the egress of the first tunnel at the network device and the egress of the second tunnel at the network device share a next hop from the network device. Based on the determination, the program also programs a set of hardware resources of the network device to store a set of next hop operations for the next hop from the network device, forward a first incoming packet through the egress of the first tunnel to the next hop based on the stored set of next hop operations, and forward a second incoming packet through the egress of the second tunnel to the next hop based on the same stored set of next hop operations.

In some embodiments, the network topology may further include an Internet Protocol route through the network device. The program may further determine that the IP route shares the next hop from the network device and program the set of hardware resources of the network device to forward a third incoming packet through the IP route to the next hop based on the same stored sets of next hop operations.

In some embodiments, a first encapsulation data may be associated with the first tunnel and a second encapsulation data may be associated with the second tunnel. The first packet may include the first encapsulation data and the second packet may include the second encapsulation data. The program may further program the set of hardware resources of the network device to decapsulate the first encapsulation data from the first packet before forwarding the first packet to the next hop and decapsulate the second encapsulation data from the second packet before forwarding the first packet to the next hop.

In some embodiments, the set of next hop operations stored for the next hop from the network device may include a packet rewrite operation configured to rewrite a destination address of the first packet and the second packet to be an address of a network device at the corresponding the next hop.

In some embodiments, the program may further determine that each route in the first plurality of multipath routes terminates at the end of the first tunnel and determine that each route in the second plurality of multipath routes terminates at the end of the second tunnel.

In some embodiments, the program may further generate a logical architecture comprising a set of data structures for implementing the first and second tunnels in the network topology in the network device. The set of data structures may correspond to the set of hardware resources of the network device.

In some embodiments, a method receives, by a network device, information associated with a network topology of a network that includes a plurality of network devices. The network topology includes a first tunnel and a second tunnel. The first tunnel includes a first plurality of multipath routes. The second tunnel includes a second plurality of multipath routes. The method further determines that the network device is an ingress of the first tunnel, the network device is an ingress of the second tunnel, and the first plurality of multipath routes and the second plurality of multipath routes share a plurality of possible next hops from the network device. Based on the determination, the method also programs a set of hardware resources of the network device to store a set of next hop operations for each possible next hop in the plurality of possible next hops, forward a first incoming packet through the first tunnel to a first next hop in the plurality of possible next hops based on the stored sets of next hop operations, and forward a second incoming packet through the second tunnel to a second next hop in the plurality of possible next hops based on the same stored sets of next hop operations.

In some embodiments, the network topology may further include an Internet Protocol route that includes a third plurality of multipath routes, the method may further determine that the third plurality of multipath routes share the plurality of possible next hops from the network device and program the set of hardware resources of the network device to forward a third incoming packet through the IP route to a third next hop in the plurality of possible next hops based on the same stored sets of next hop operations.

In some embodiments, the first tunnel may be a first multipath label switching (MPLS) tunnel and the second tunnel may be a second MPLS tunnel. A first MPLS label may be associated with the first MPLS tunnel and a second MPLS label may be associated with the second MPLS tunnel. The method may further program the set of hardware resources of the network device to encapsulate the first packet with the first MPLS label and encapsulate the second packet with the second MPLS label.

In some embodiments, the set of next hop operations stored for each possible next hop in the plurality of possible next hops may include a packet rewrite operation configured to rewrite a destination address of a particular packet to be an address of a network device at the corresponding the possible next hop.

In some embodiments, the network may be a first network. The network device may be included in the first network and a second network and may be configured to operate at the edge of the second network.

In some embodiments, the method may further generate a logical architecture comprising a set of data structures for implementing the first and second tunnels in the network topology in the network device. The set of data structures may correspond to the set of hardware resources of the network device.

In some embodiments, a network device includes a processor and a non-transitory machine-readable medium that stores instructions. The instructions cause the processor to receive information associated with a network topology of a network that includes a plurality of network devices. The network topology includes a first tunnel and a second tunnel. The first tunnel includes a first plurality of multipath routes. The second tunnel includes a second plurality of multipath routes. The instructions further cause the processor to determine that the network device is an ingress of the first tunnel, the network device is an ingress of the second tunnel, and the first plurality of multipath routes and the second plurality of multipath routes share a plurality of possible next hops from the network device. Based on the determination, the instructions also cause the processor to program a set of hardware resources of the network device to store a set of next hop operations for each possible next hop in the plurality of possible next hops, forward a first incoming packet through the first tunnel to a first next hop in the plurality of possible next hops based on the stored sets of next hop operations, and forward a second incoming packet through the second tunnel to a second next hop in the plurality of possible next hops based on the same stored sets of next hop operations.

In some embodiments, the network topology may further include an Internet Protocol route that includes a third plurality of multipath routes. The instructions may further cause the processor to determine that the third plurality of multipath routes share the plurality of possible next hops from the network device and program the set of hardware resources of the network device to forward a third incoming packet through the IP route to a third next hop in the plurality of possible next hops based on the same stored sets of next hop operations.

In some embodiments, the first tunnel may be a first multipath label switching (MPLS) tunnel and the second tunnel may be a second MPLS tunnel. A first MPLS label may be associated with the first MPLS tunnel and a second MPLS label may be associated with the second MPLS tunnel. The instructions may further cause the processor to program the set of hardware resources of the network device to encapsulate the first packet with the first MPLS label and encapsulate the second packet with the second MPLS label.

In some embodiments, the set of next hop operations stored for each possible next hop in the plurality of possible next hops may include a packet rewrite operation configured to rewrite a destination address of a particular packet to be an address of a network device at the corresponding the possible next hop.

In some embodiments, the network may be a first network. The network device may be included in the first network and a second network and may be configured to operate at the edge of the second network.

In some embodiments, the instructions may further cause the processor to generate a logical architecture comprising a set of data structures for implementing the first and second tunnels in the network topology in the network device. The set of data structures may correspond to the set of hardware resources of the network device.

In some embodiments, a non-transitory machine-readable medium stores a program executable by at least one processing unit of a network device. The program receives information associated with a network topology of a network that includes a plurality of network devices. The network topology includes a first tunnel and a second tunnel. The first tunnel includes a first plurality of multipath routes. The second tunnel includes a second plurality of multipath routes. The program further determines that the network device is an ingress of the first tunnel, the network device is an ingress of the second tunnel, and the first plurality of multipath routes and the second plurality of multipath routes share a plurality of possible next hops from the network device. Based on the determination, the program also programs a set of hardware resources of the network device to store a set of next hop operations for each possible next hop in the plurality of possible next hops, forward a first incoming packet through the first tunnel to a first next hop in the plurality of possible next hops based on the stored sets of next hop operations, and forward a second incoming packet through the second tunnel to a second next hop in the plurality of possible next hops based on the same stored sets of next hop operations.

In some embodiments, the network topology may further include an Internet Protocol route that includes a third plurality of multipath routes. The program may further determine that the third plurality of multipath routes share the plurality of possible next hops from the network device and program the set of hardware resources of the network device to forward a third incoming packet through the IP route to a third next hop in the plurality of possible next hops based on the same stored sets of next hop operations.

In some embodiments, the first tunnel may be a first multipath label switching (MPLS) tunnel and the second tunnel may be a second MPLS tunnel. A first MPLS label may be associated with the first MPLS tunnel and a second MPLS label may be associated with the second MPLS tunnel. The program may further program the set of hardware resources of the network device to encapsulate the first packet with the first MPLS label and encapsulate the second packet with the second MPLS label.

In some embodiments, the set of next hop operations stored for each possible next hop in the plurality of possible next hops may include a packet rewrite operation configured to rewrite a destination address of a particular packet to be an address of a network device at the corresponding the possible next hop.

In some embodiments, the program may further generate a logical architecture comprising a set of data structures for implementing the first and second tunnels in the network topology in the network device. The set of data structures may correspond to the set of hardware resources of the network device.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving, by a network device, information associated with a network topology of a network comprising a plurality of network devices, the network topology comprising a first tunnel and a second tunnel, the first tunnel comprising a first plurality of multipath routes, the second tunnel comprising a second plurality of multipath routes;
based on the received information associated with the network topology of the network, determining that the network device is an egress of the first tunnel that is configured to remove encapsulation data, the network device is an egress of the second tunnel that is configured to remove encapsulation data, and the egress of the first tunnel at the network device and the egress of the second tunnel at the network device share a next hop from the network device; and
based on the determination, programming a set of hardware resources of the network device to:
store a set of next hop operations for the next hop from the network device,
forward a first incoming packet through the egress of the first tunnel to the next hop based on the stored set of next hop operations, and
forward a second incoming packet through the egress of the second tunnel to the next hop based on the same stored set of next hop operations.

2. The method of claim 1, wherein the network topology further comprises an Internet Protocol route through the network device, the method further comprising:
determining that the IP route shares the next hop from the network device; and
programming the set of hardware resources of the network device to forward a third incoming packet through the IP route to the next hop based on the same stored sets of next hop operations.

3. The method of claim 1, wherein a first encapsulation data is associated with the first tunnel and a second encapsulation data is associated with the second tunnel, wherein the first packet includes the first encapsulation data and the second packet includes the second encapsulation data, the method further comprising programming the set of hardware resources of the network device to:
decapsulate the first encapsulation data from the first packet before forwarding the first packet to the next hop, and
decapsulate the second encapsulation data from the second packet before forwarding the first packet to the next hop.

4. The method of claim 1, wherein the set of next hop operations stored for the next hop from the network device comprises a packet rewrite operation configured to rewrite a destination address of the first packet and the second packet to be an address of a network device at the corresponding the next hop.

5. The method of claim 1 further comprising:
determining that each route in the first plurality of multipath routes terminates at the end of the first tunnel; and
determining that each route in the second plurality of multipath routes terminates at the end of the second tunnel.

6. The method of claim 1, wherein the network is a first network, wherein the network device is included in the first network and a second network and is configured to operate at the edge of the second network.

7. The method of claim 1 further comprising generating a logical architecture comprising a set of data structures for implementing the first and second tunnels in the network topology in the network device, wherein the set of data structures correspond to the set of hardware resources of the network device.

8. A network device comprising:
a processor; and
a non-transitory machine-readable medium storing instructions that when executed by the processor cause the processor to:
receive information associated with a network topology of a network comprising a plurality of network devices, the network topology comprising a first tunnel and a second tunnel, the first tunnel comprising a first plurality of multipath routes, the second tunnel comprising a second plurality of multipath routes;
based on the received information associated with the network topology of the network, determine that the network device is an egress of the first tunnel that is configured to remove encapsulation data, the network device is an egress of the second tunnel that is configured to remove encapsulation data, and the egress of the first tunnel at the network device and the egress of the second tunnel at the network device share a next hop from the network device; and
based on the determination, program a set of hardware resources of the network device to:
store a set of next hop operations for the next hop from the network device,
forward a first incoming packet through the egress of the first tunnel to the next hop based on the stored set of next hop operations, and
forward a second incoming packet through the egress of the second tunnel to the next hop based on the same stored set of next hop operations.

9. The network device of claim 8, wherein the network topology further comprises an Internet Protocol route through the network device, wherein the instructions further cause the processor to:
determine that the IP route shares the next hop from the network device; and
program the set of hardware resources of the network device to forward a third incoming packet through the IP route to the next hop based on the same stored sets of next hop operations.

10. The network device of claim 8, wherein a first encapsulation data is associated with the first tunnel and a second encapsulation data is associated with the second tunnel, wherein the first packet includes the first encapsulation data and the second packet includes the second encapsulation data, wherein the instructions further cause the processor to program the set of hardware resources of the network device to:

decapsulate the first encapsulation data from the first packet before forwarding the first packet to the next hop, and decapsulate the second encapsulation data from the second packet before forwarding the first packet to the next hop.

11. The network device of claim 8, wherein the set of next hop operations stored for the next hop from the network device comprises a packet rewrite operation configured to rewrite a destination address of the first packet and the second packet to be an address of a network device at the corresponding the next hop.

12. The network device of claim 8, wherein the instructions further cause the processor to:

determine that each route in the first plurality of multipath routes terminates at the end of the first tunnel; and determine that each route in the second plurality of multipath routes terminates at the end of the second tunnel.

13. The network device of claim 8, wherein the network is a first network, wherein the network device is included in the first network and a second network and is configured to operate at the edge of the second network.

14. The network device of claim 8, wherein the instructions further cause the processor to generate a logical architecture comprising a set of data structures for implementing the first and second tunnels in the network topology in the network device, wherein the set of data structures correspond to the set of hardware resources of the network device.

15. A non-transitory machine-readable medium storing a program executable by at least one processing unit of a network device, the program comprising sets of instructions for:

receiving information associated with a network topology of a network comprising a plurality of network devices, the network topology comprising a first tunnel and a second tunnel, the first tunnel comprising a first plurality of multipath routes, the second tunnel comprising a second plurality of multipath routes;

based on the received information associated with the network topology of the network, determining that the network device is an egress of the first tunnel that is configured to remove encapsulation data, the network device is an egress of the second tunnel that is configured to remove encapsulation data, and the egress of the first tunnel at the network device and the egress of the second tunnel at the network device share a next hop from the network device; and based on the determination, programming a set of hardware resources of the network device to:

store a set of next hop operations for the next hop from the network device, forward a first incoming packet through the egress of the first tunnel to the next hop based on the stored set of next hop operations, and forward a second incoming packet through the egress of the second tunnel to the next hop based on the same stored set of next hop operations.

16. The non-transitory machine-readable medium of claim 15, wherein the network topology further comprises an Internet Protocol route through the network device, wherein the program further comprises sets of instructions for:

determining that the IP route shares the next hop from the network device; and programming the set of hardware resources of the network device to forward a third incoming packet through the IP route to the next hop based on the same stored sets of next hop operations.

17. The non-transitory machine-readable medium of claim 15, wherein a first encapsulation data is associated with the first tunnel and a second encapsulation data is associated with the second tunnel, wherein the first packet includes the first encapsulation data and the second packet includes the second encapsulation data, wherein the program further comprises a set of instructions for programming the set of hardware resources of the network device to:

decapsulate the first encapsulation data from the first packet before forwarding the first packet to the next hop, and decapsulate the second encapsulation data from the second packet before forwarding the first packet to the next hop.

18. The non-transitory machine-readable medium of claim 15, wherein the set of next hop operations stored for the next hop from the network device comprises a packet rewrite operation configured to rewrite a destination address of the first packet and the second packet to be an address of a network device at the corresponding the next hop.

19. The non-transitory machine-readable medium of claim 15, wherein the program further comprises sets of instructions for:

determining that each route in the first plurality of multipath routes terminates at the end of the first tunnel; and determining that each route in the second plurality of multipath routes terminates at the end of the second tunnel.

20. The non-transitory machine-readable medium of claim 15, wherein the program further comprises a set of instructions for generating a logical architecture comprising a set of data structures for implementing the first and second tunnels in the network topology in the network device, wherein the set of data structures correspond to the set of hardware resources of the network device.

* * * * *